(12) United States Patent
Lackner

(10) Patent No.: US 11,992,801 B2
(45) Date of Patent: May 28, 2024

(54) SYSTEM, METHOD, AND DEVICE FOR SMALL SCALE CARBON DIOXIDE COLLECTION

(71) Applicant: ARIZONA BOARD OF REGENTS, Scottsdale, AZ (US)

(72) Inventor: Klaus Lackner, Paradise Valley, AZ (US)

(73) Assignee: Arizona Board of Regents on Behalf of Arizona State University, Scottsdale, AZ (US)

(*) Notice: Subject to any disclaimer, the term of this patent is extended or adjusted under 35 U.S.C. 154(b) by 431 days.

(21) Appl. No.: 17/602,930

(22) PCT Filed: Apr. 9, 2020

(86) PCT No.: PCT/US2020/027522
§ 371 (c)(1),
(2) Date: Oct. 11, 2021

(87) PCT Pub. No.: WO2020/210529
PCT Pub. Date: Oct. 15, 2020

(65) Prior Publication Data
US 2022/0176307 A1    Jun. 9, 2022

Related U.S. Application Data

(60) Provisional application No. 62/832,551, filed on Apr. 11, 2019.

(51) Int. Cl.
*B01D 53/02* (2006.01)
*B01J 20/28* (2006.01)
(Continued)

(52) U.S. Cl.
CPC ...... *B01D 53/025* (2013.01); *B01J 20/28019* (2013.01); *B01J 20/3475* (2013.01);
(Continued)

(58) Field of Classification Search
CPC ........ B01D 2253/206; B01D 2257/504; B01D 2258/06; B01D 2259/40083;
(Continued)

(56) References Cited

U.S. PATENT DOCUMENTS 5,071,547 A    12/1991  Cazer et al.
5,595,949 A *  1/1997  Goldstein .............. B01D 53/62
                                                           423/220
(Continued)

OTHER PUBLICATIONS

Wang, Tao et al., "Moisture Swing Sorbent for Carbon Dioxide Capture from Ambient Air", Environmental Science & Technology, 45(15):6670-6675 (2011).

*Primary Examiner* — Christopher P Jones
(74) *Attorney, Agent, or Firm* — BOOTH UDALL FULLER, PLC

(57) ABSTRACT

A device, system, and method for small scale $CO_2$ extraction is disclosed. The device includes a sorbent bed having a sorbent resin. The device also includes a blower in fluid communication with the sorbent bed through at least one duct, as well as a collection tray beneath the sorbent bed and having a drain. The device also includes a capture configuration and a regeneration configuration. The capture configuration includes an air flow driven by the blower passing through the sorbent resin. The regeneration configuration includes the flooding of at least the sorbent resin with regeneration fluid. The regeneration fluid has a higher dissolve inorganic carbon concentration after flooding the sorbent resin. Multiple devices may be employed together as a system capable of providing a continuous product stream having an upgraded concentration of $CO_2$.

20 Claims, 15 Drawing Sheets

(51) Int. Cl.
  *B01J 20/34* (2006.01)
  *C01B 32/50* (2017.01)
(52) U.S. Cl.
  CPC ........ *C01B 32/50* (2017.08); *B01D 2257/504* (2013.01); *B01D 2259/40083* (2013.01); *B01J 2220/56* (2013.01)
(58) Field of Classification Search
  CPC .............. B01D 53/025; B01D 53/0407; B01D 53/0446; B01J 20/28019; B01J 20/3475; B01J 2220/56; C01B 32/50; Y02C 20/40; Y02P 20/151
  See application file for complete search history.

(56) References Cited

U.S. PATENT DOCUMENTS

| | | | |
|---|---|---|---|
| 6,746,515 B2 * | 6/2004 | Wegeng | C01B 3/56 95/115 |
| 11,478,745 B2 | 10/2022 | Lackner | |
| 2011/0139599 A1 | 6/2011 | Al-Garni et al. | |
| 2011/0189075 A1 * | 8/2011 | Wright | B01D 53/62 502/55 |
| 2012/0304858 A1 | 12/2012 | Wright et al. | |
| 2013/0210157 A1 * | 8/2013 | Chen | B01J 20/226 423/437.1 |
| 2014/0178278 A1 * | 6/2014 | Siskin | B01D 53/62 423/228 |
| 2017/0259245 A1 * | 9/2017 | Hoshino | B01D 53/81 |

\* cited by examiner

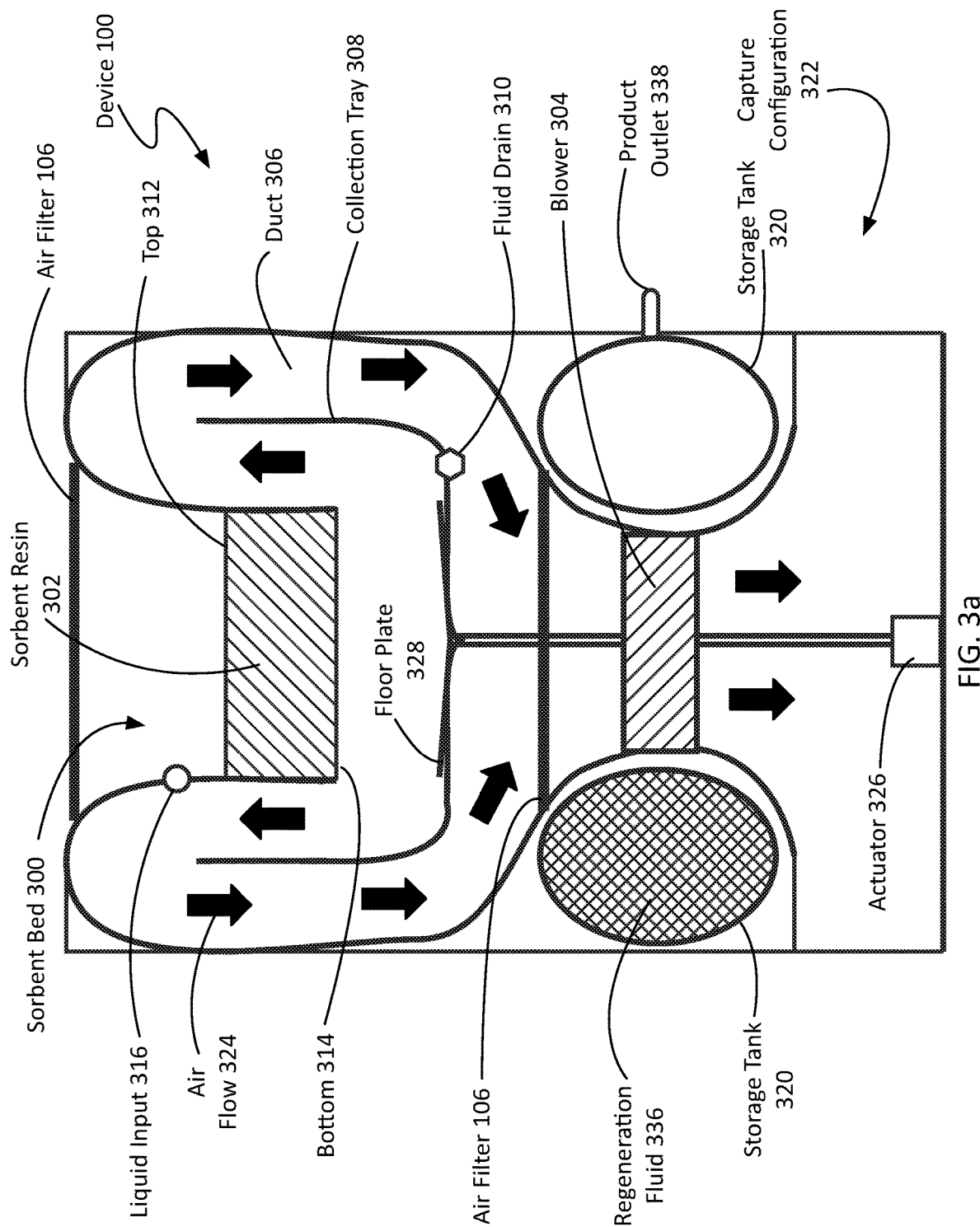

SYSTEM, METHOD, AND DEVICE FOR SMALL SCALE CARBON DIOXIDE COLLECTION

RELATED APPLICATIONS

This application is the U.S. National Stage of International Application No. PCT/US2020/027522, filed Apr. 9, 2020, which claims the benefit of U.S. provisional patent application 62/832,551, filed Apr. 11, 2019, titled "Small Scale $CO_2$ Extraction Device," the contents of each of which are hereby incorporated by reference in their entireties.

TECHNICAL FIELD

Aspects of this document relate generally to carbon dioxide collection.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis.

However, a number of factors stand as obstacles. The technology is still new, and is often expensive, cumbersome, and fragile. Conventional capture devices also tend to have large initial capital costs in addition to high operating costs. This may be improved by reducing the cost of the devices, creating a new revenue stream from the captured $CO_2$, or both. Developing revenue streams from captured $CO_2$ is further complicated by scale; conventional capture technologies are typically only available at an industrial scale, complicating efforts to prototype applications for captured $CO_2$.

SUMMARY

According to one aspect, a carbon dioxide collection system includes a plurality of carbon dioxide collection devices, each device having a sorbent bed including a sorbent resin. Each device also includes a blower in fluid communication with the sorbent bed through at least one duct, as well as a collection tray beneath the sorbent bed. The collection tray includes a fluid drain. Each device also includes an air intake and an air exhaust in fluid communication with the air intake through the sorbent bed, the at least one duct, and the blower, as well as a capture configuration including an air flow driven by the blower and flowing from the air intake to the air exhaust and passing through the sorbent resin of the sorbent bed, the at least one duct, and the blower. Each device also includes a regeneration configuration having the sorbent bed submerged in a regeneration fluid. Moving the device from the capture configuration to the regeneration configuration includes flooding at least the sorbent resin of the sorbent bed with the regeneration fluid having a first dissolved inorganic carbon (DIC) concentration, the regeneration fluid introduced to the sorbent resin via a liquid input and preventing the air flow from passing through the sorbent resin. Moving the device from the regeneration configuration to the capture configuration includes removing the regeneration fluid collected in the collection tray through the fluid drain in the collection tray, the regeneration fluid passing through the fluid drain having a second DIC concentration higher than the first DIC concentration.

Particular embodiments may comprise one or more of the following features. For each carbon dioxide collection device of the plurality of carbon dioxide collection devices, one of the at least one ducts may be coupled to and/or in fluid communication with one of the at least one ducts of a different carbon dioxide collection device at a bridge point on each of the two ducts. For each carbon dioxide collection device of the plurality of carbon dioxide collection devices, all bridge points may be located between the blower and the sorbent bed. The plurality of carbon dioxide collection devices may be connected in series, such that for all carbon dioxide collection devices except a first collection device and a last collection device, the air intake of each device may be in fluid communication with the air exhaust of another device and each device may be coupled to two other devices. The first collection device and the last collection device may each only be coupled to a single collection device. The sorbent resin of each carbon dioxide collection device of the plurality of carbon dioxide collection devices may be a moisture swing carbon dioxide sorbent. Each carbon dioxide collection device of the plurality of carbon dioxide collection devices may further include an actuator coupled to a floor plate. The sorbent bed may have a top and a bottom opposite the top. Moving the device from the capture configuration to the regeneration configuration may further include pressing the floor plate against the bottom of the sorbent bed with the actuator, preventing a majority of the regeneration fluid flooding the sorbent resin from escaping the sorbent bed. Moving the device from the regeneration configuration to the capture configuration may further include moving the floor plate away from the bottom of the sorbent bed using the actuator, allowing the regeneration fluid to flow into the collection tray and out the fluid drain. Each carbon dioxide collection device of the plurality of carbon dioxide collection devices may further include an actuator coupled to the sorbent bed. The sorbent bed has a top and a bottom opposite the top. Moving the device from the capture configuration to the regeneration configuration may include moving the sorbent bed downward with the actuator, pressing the bottom of the sorbent bed against the collection tray, preventing a majority of the regeneration fluid flooding the sorbent resin from escaping the sorbent bed. Moving the device from the regeneration configuration to the capture configuration may further include moving the sorbent bed away from the collection tray using the actuator, allowing the regeneration fluid to flow into the collection tray and out the fluid drain. For each carbon dioxide collection device of the plurality of carbon dioxide collection devices, the collection tray may include at least one wall encircling the collection tray. The at least one wall may extend upward higher than the sorbent bed. For each carbon dioxide collection device of the plurality of carbon dioxide collection devices, moving the device from the capture configuration to the regeneration configuration may include flooding the collection tray with regeneration fluid until the sorbent resin is submerged in the regeneration fluid. For each carbon dioxide collection device of the plurality of carbon dioxide collection devices, moving the device from the regeneration configuration to the capture configuration may include draining the regeneration fluid from the collection tray through the fluid drain. For at least one carbon dioxide collection device of the plurality of carbon dioxide collection devices, the air flow may pass downward through the sorbent resin. Each carbon dioxide collection device of the plurality of carbon dioxide collection devices may further include at least one air filter. The at least one air filter may be located between the air intake and the air exhaust. For each carbon dioxide collection device of the plurality of carbon dioxide collection devices, the regeneration fluid may be one of a hydroxide solution, a carbonate solution, and a bicarbonate solution. For at least one carbon dioxide collection device of the plurality of carbon dioxide collection devices, the sorbent resin may include a plurality of packed sorbent beads. The system may further include at least one storage tank of regeneration fluid in fluid communication with the liquid input of at least one carbon dioxide collection device of the plurality of carbon dioxide collection devices. Makeup water may be added to a last storage tank of the at least one storage tank from a makeup water source coupled to the last storage tank. The last storage tank may be the storage tank holding the regeneration fluid having the lowest DIC concentration. The system may further include at least two storage tanks, including at least a first storage tank containing regeneration fluid having the highest DIC concentration of the system and a last storage tank containing regeneration fluid having the lowest DIC concentration of the system. Each storage tank of the at least two storage tanks may be in fluid communication with both the liquid input and the fluid drain of each carbon dioxide collection device of the plurality of carbon dioxide collection devices. For each carbon dioxide collection device of the plurality of carbon dioxide collection devices, while in the regeneration configuration, the regeneration fluid of each of the at least two storage tanks may be used in turn to flood the sorbent resin as the regeneration fluid having the first DIC concentration. For each carbon dioxide collection device of the plurality of carbon dioxide collection devices, while in the regeneration configuration, the regeneration fluid having the second DIC concentration may be passed through the fluid drain to the storage tank having the next higher DIC concentration as the storage tank that provided the regeneration fluid having the first DIC concentration. For each carbon dioxide collection device of the plurality of carbon dioxide collection devices, the regeneration fluid taken from the first storage tank, having the highest DIC concentration, may be used to flood the sorbent resin and then sent down the fluid drain. All fluid drains may be coupled to a product outlet emitting a liquid product stream. Makeup water may be added to the last storage tank of the at least two storage tanks. The system may further include a carbon dioxide extractor in fluid communication with the product outlet. The carbon dioxide extractor may receive the liquid product stream, extracting gaseous carbon dioxide from the liquid product stream. The system may further include at least three storage tanks having a first storage tank containing regeneration fluid with the highest DIC concentration, a last storage tank containing regeneration fluid with the lowest DIC concentration, and/or a second-to-last storage tank containing regeneration fluid with the second-to-lowest DIC concentration. The carbon dioxide extractor may produce a lean regeneration fluid by extracting gaseous carbon dioxide from the liquid product stream. The lean regeneration fluid may be stored in the second-to-last storage tank. The transition between the capture configuration and the regeneration configuration may be staggered for each carbon dioxide collection device of the plurality of carbon dioxide collection devices, such that the liquid product stream is continuous.

According to another aspect of the disclosure, a carbon dioxide collection device includes a sorbent bed having a sorbent resin, and a blower in fluid communication with the sorbent bed through at least one duct. The device also includes a collection tray beneath the sorbent bed, the collection tray having a fluid drain. The device further includes an air intake and an air exhaust in fluid communication with the air intake through the sorbent bed, the at least one duct, and the blower. The device also includes a capture configuration having an air flow driven by the blower and flowing from the air intake to the air exhaust and passing through the sorbent resin of the sorbent bed, the at least one duct, and the blower. The device includes a regeneration configuration having the sorbent bed submerged in a regeneration fluid. Moving the device from the capture configuration to the regeneration configuration includes flooding at least the sorbent resin of the sorbent bed with the regeneration fluid having a first dissolved inorganic carbon (DIC) concentration, the regeneration fluid introduced to the sorbent resin via a liquid input and preventing the air flow from passing through the sorbent resin. Moving the device from the regeneration configuration to the capture configuration includes removing the regeneration fluid collected in the collection tray through the fluid drain in the collection tray, the regeneration fluid passing through the fluid drain having a second DIC concentration higher than the first DIC concentration.

Particular embodiments may comprise one or more of the following features. The sorbent resin may be a moisture swing carbon dioxide sorbent. The device may include an actuator coupled to a floor plate. The sorbent bed may have a top and a bottom opposite the top. Moving the device from the capture configuration to the regeneration configuration may further include pressing the floor plate against the bottom of the sorbent bed with the actuator, preventing a majority of the regeneration fluid flooding the sorbent resin from escaping the sorbent bed. Moving the device from the regeneration configuration to the capture configuration may further include moving the floor plate away from the bottom of the sorbent bed using the actuator, allowing the regeneration fluid to flow into the collection tray and out the fluid drain. The device may include an actuator coupled to the sorbent bed. Moving the device from the capture configuration to the regeneration configuration may include moving the sorbent bed downward with the actuator, pressing the bottom of the sorbent bed against the collection tray, preventing a majority of the regeneration fluid flooding the sorbent resin from escaping the sorbent bed. Moving the device from the regeneration configuration to the capture configuration may further include moving the sorbent bed away from the collection tray using the actuator, allowing the regeneration fluid to flow into the collection tray and out the fluid drain. The collection tray may include at least one wall encircling the collection tray, the at least one wall extending upward higher than the sorbent bed. Moving the device from the capture configuration to the regeneration configuration may include flooding the collection tray with regeneration fluid until the sorbent resin is submerged in the regeneration fluid. Moving the device from the regeneration configuration to the capture configuration may include draining the regeneration fluid from the collection tray through the fluid drain. The air flow may pass downward through the sorbent resin. The device may further include at least one air filter. The at least one air filter may be located between the air intake and the air exhaust. The regeneration fluid may be one of a hydroxide solution, a carbonate solution, and a bicarbonate solution. The sorbent resin may include a plurality of packed sorbent beads. The device may further include at least one storage tank of regeneration fluid in fluid communication with the liquid input. Makeup water may be added to a last storage tank of the at least one storage tank from a makeup water source coupled to the last storage tank, the last storage tank being the storage tank holding the regeneration fluid having the lowest DIC concentration. The device may further include at least two storage tanks, which may include at least a first storage tank containing regeneration fluid having the highest DIC concentration and a last storage tank containing regeneration fluid having the lowest DIC concentration. Each storage tank of the at least two storage tanks may be in fluid communication with both the liquid input and the fluid drain. While in the regeneration configuration, the regeneration fluid of each of the at least two storage tanks may be used in turn to flood the sorbent resin as the regeneration fluid having the first DIC concentration. While in the regeneration configuration, the regeneration fluid having the second DIC concentration may be passed through the fluid drain to the storage tank having the next higher DIC concentration as the storage tank that provided the regeneration fluid having the first DIC concentration. The regeneration fluid taken from the first storage tank, having the highest DIC concentration, may be used to flood the sorbent resin and then sent down the fluid drain and through a product outlet as a liquid product stream. Makeup water may be added to the last storage tank of the at least two storage tanks. The device may further include a carbon dioxide extractor in fluid communication with the product outlet, the carbon dioxide extractor receiving the liquid product stream, extracting gaseous carbon dioxide from the liquid product stream. The device may further include at least three storage tanks including a first storage tank containing regeneration fluid with the highest DIC concentration, a last storage tank containing regeneration fluid with the lowest DIC concentration, and/or a second-to-last storage tank containing regeneration fluid with the second-to-lowest DIC concentration. The carbon dioxide extractor may produce a lean regeneration fluid by extracting gaseous carbon dioxide from the liquid product stream. The lean regeneration fluid may be stored in the second-to-last storage tank.

According to yet another aspect of the disclosure, a method for small-scale carbon dioxide collection includes pulling atmospheric air through a sorbent bed having a sorbent resin absorbing carbon dioxide from the atmospheric air, the atmospheric air being pulled using a blower, the sorbent bed and blower in fluid communication through at least one duct, the atmospheric air passing through the sorbent resin, through the at least one duct, and out the blower, the blower, the at least one duct. The sorbent bed belonging to a carbon dioxide collection device. The method also includes transitioning the collection device from a capture configuration to a regeneration configuration by closing a bottom of the sorbent bed, cutting off an air flow through the sorbent resin. The method further includes regenerating the sorbent resin by flooding the sorbent bed with regeneration fluid having a first dissolved inorganic carbon (DIC) concentration and introduced via a liquid input, submerging the sorbent resin. The method includes transitioning the collection device from the regeneration configuration to the capture configuration by opening the bottom of the sorbent bed, allowing the regeneration fluid having a second DIC concentration higher than the first DIC concentration to empty into a collecting tray and also allowing the air flow to continue through the sorbent resin. Finally, the method includes draining the regeneration fluid from the collecting tray.

Particular embodiments may comprise one or more of the following features. The sorbent resin may be a moisture swing carbon dioxide sorbent. Closing the bottom of the sorbent bed may include pressing a floor plate against the bottom of the sorbent bed with an actuator coupled to the floor plate. Opening the bottom of the sorbent bed may include moving the floor plate away from the bottom of the sorbent bed with the actuator. Closing the bottom of the sorbent bed may include moving the sorbent bed downward with an actuator coupled to the sorbent bed, pressing the bottom of the sorbent bed against the collection tray. Opening the bottom of the sorbent bed may include moving the sorbent bed away from the collection tray using the actuator. The air flow may pass downward through the sorbent resin. The regeneration fluid may be one of a hydroxide solution, a carbonate solution, and a bicarbonate solution. The sorbent resin may include a plurality of packed sorbent beads. The collection device may further include at least one storage tank of regeneration fluid in fluid communication with the liquid input. The method may also include adding makeup water to a last storage tank of the at least one storage tank from a makeup water source coupled to the last storage tank. The last storage tank may be the storage tank holding the regeneration fluid having the lowest DIC concentration.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIGS. 3a and 3b are a cross-sectional view, along line A-A of FIG. 2, of one embodiment of a device for small-scale $CO_2$ collection in capture and regeneration configurations, respectively;

DETAILED DESCRIPTION

Figure 1:
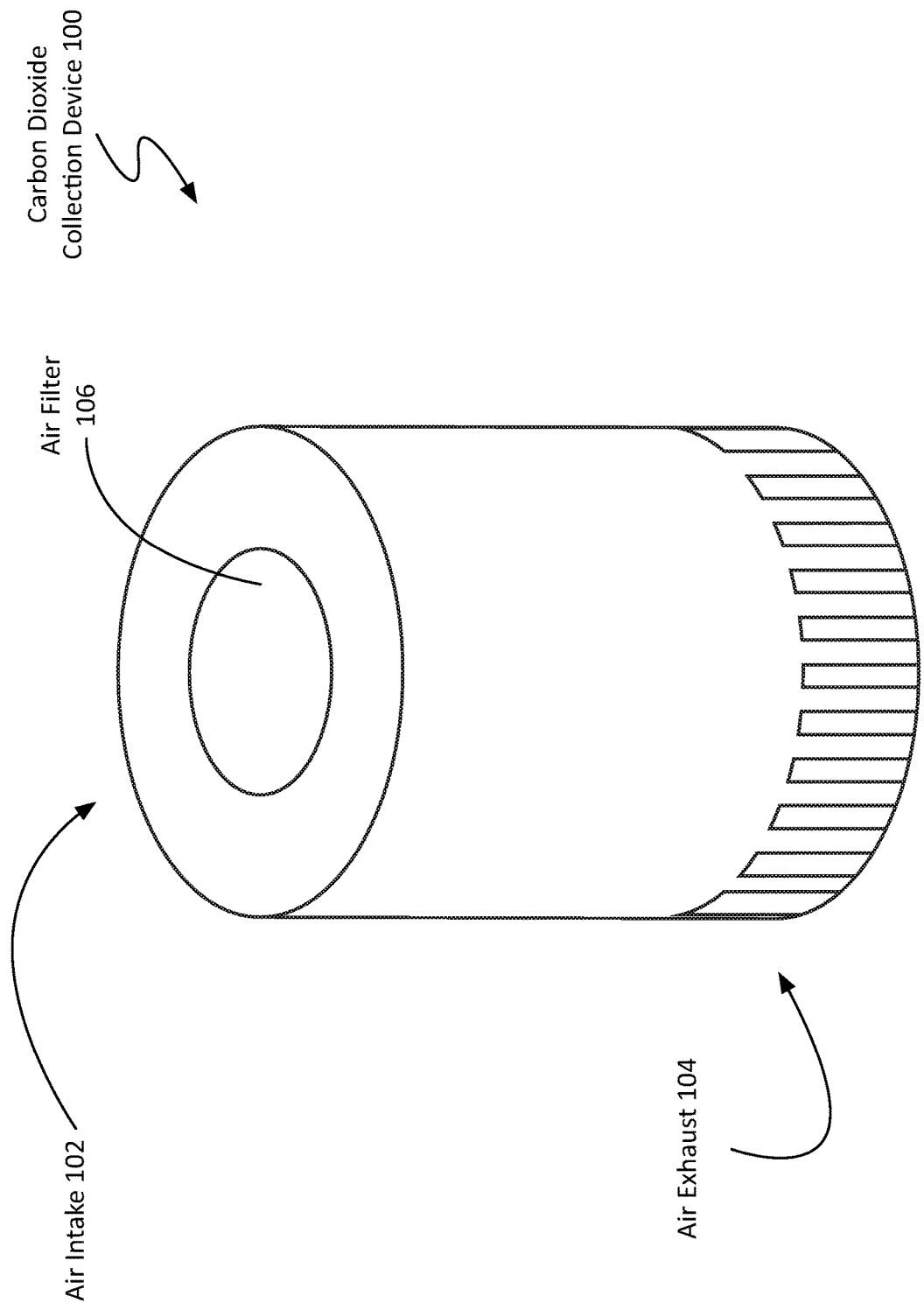
FIG. 1 is a perspective view of a device for small-scale $CO_2$ collection.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis.

However, a number of factors stand as obstacles. The technology is still new, and is often expensive, cumbersome, and fragile. Conventional capture devices also tend to have large initial capital costs in addition to high operating costs. This may be improved by reducing the cost of the devices, creating a new revenue stream from the captured $CO_2$, or both. Developing revenue streams from captured $CO_2$ is further complicated by scale; conventional capture technologies are typically only available at an industrial scale, complicating efforts to prototype applications for captured $CO_2$.

Contemplated herein is a system, method, and device for small-scale collection of $CO_2$ from the atmosphere. The devices and systems contemplated herein are able to satisfy the need of a small-scale application without great expense or overhead. The device makes use of a simple design that is robust, as well as efficient. According to various embodiments, this collection device is relatively small compared to conventional solutions, some embodiments being roughly the size of a desk. The device may be used to harvest $CO_2$ from ambient air, even indoor air. A device able to operate at this scale is advantageous for smaller scale $CO_2$ applications that often occur outside of industrial contexts. A small-scale collection device or system allows for the gathering and upgrading of $CO_2$ on-site for a small-scale application, rather than relying on outside sources.

These simple devices may be implemented as individual units, or may be utilized as multiple units working together as a system, potentially providing a continuous stream of $CO_2$-upgraded gas or dissolved inorganic carbon (DIC)-rich liquid. It should be noted that while many of the embodiments of the device may be intended for a small-scale application, the geometries and processes contemplated herein may be equally well applied to larger, industrial scale devices.

Figure 2:
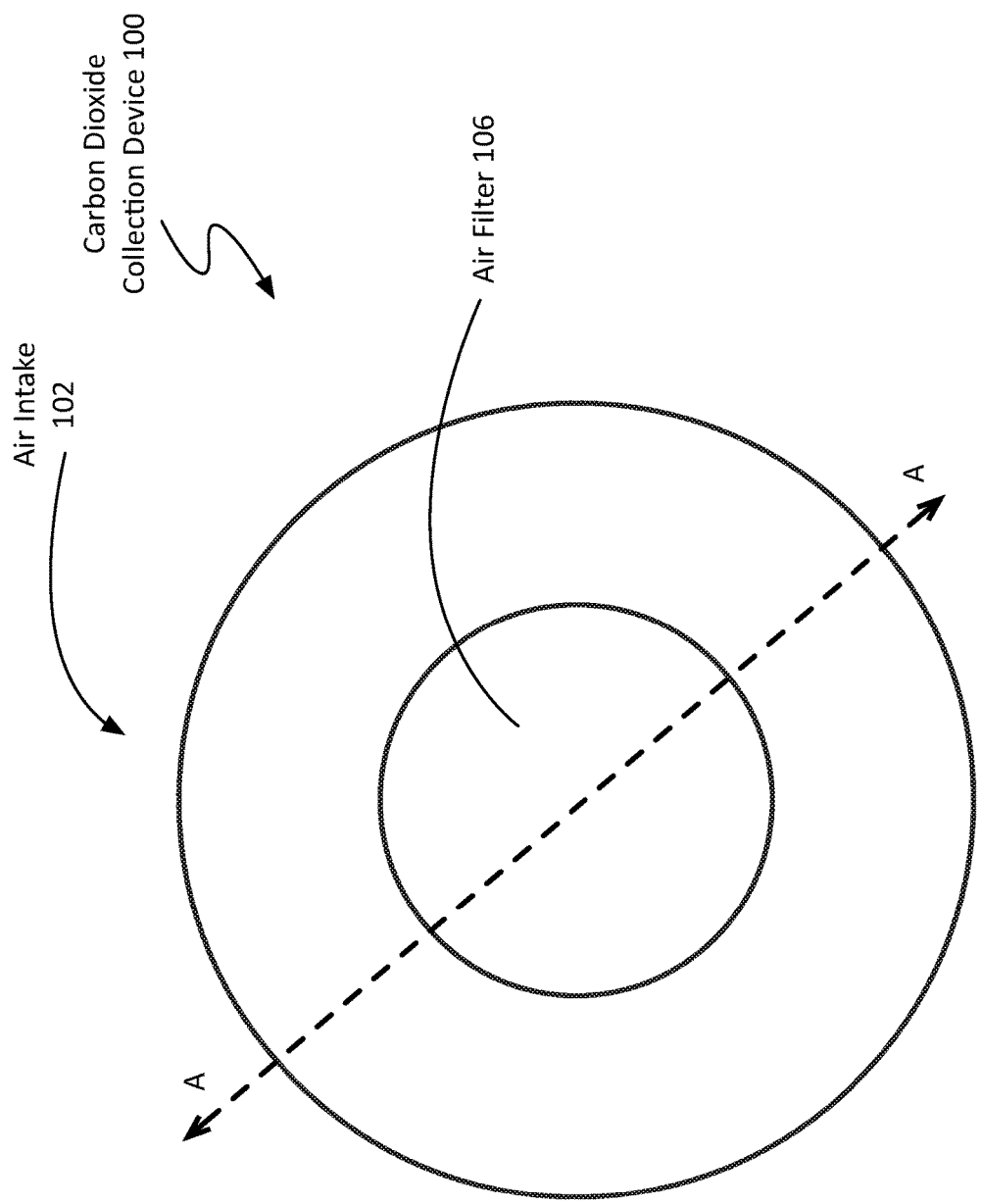
FIG. 2 is a top view of the device of FIG. 1.

FIG. 1 is a perspective view of a non-limiting example of a device 100 for small-scale $CO_2$ collection. FIG. 2 is a top view of the device 100 of FIG. 1. As shown, the device 100 comprises an air intake 102 and an air exhaust 104. In some embodiments, the air intake 102 and exhaust 104 may be on opposite sides of the device 100, as shown. In other embodiments, the air intake 102 and exhaust 104 may be near each other, connected by one or more ducts.

According to various embodiments, the carbon dioxide collection device 100 may have one or more air filters 106, depending upon the environment in which the device 100 is intended to be used. Small-scale carbon dioxide collection devices may be advantageous for use as a $CO_2$ supply for small scale manufacturing, food processing, small scale fuel production, research, and other activities that do not require large amounts of carbon dioxide, but a reliable supply that is readily available.

Figure 3B:
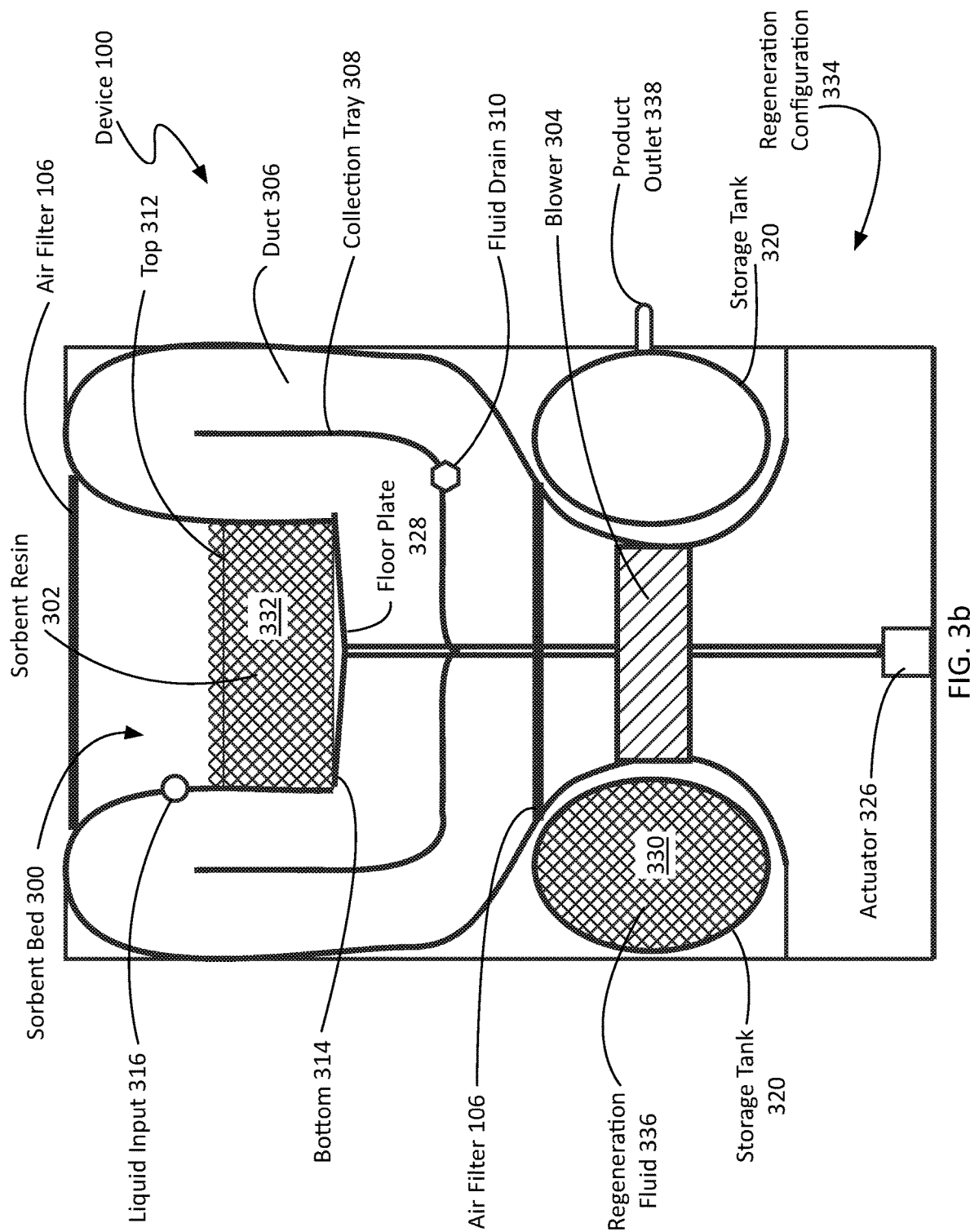

FIG. 3*ab* is a cross-sectional view, along line A-A of FIG. 2, of a non-limiting example of a device 100 for small-scale $CO_2$ collection. Specifically, FIG. 3*a* shows the device 100 in a capture configuration 322, and FIG. 3*b* shows the device 100 in a regeneration configuration 334. Both configurations will be discussed in greater detail, below.

According to various embodiments, the device 100 makes use of a sorbent resin 302 for the capture and release of atmospheric carbon dioxide. As shown, the sorbent resin 302 is held in a sorbent bed 300, which provides structural stability to the sides of the resin, but is open on the top 312 and bottom 314 to a sufficient degree that air and liquid can flow through the sorbent resin 302 while the resin 302 remains intact and in place. As will be discussed in greater detail below, in some embodiments, the sorbent resin 302 may be a moisture swing sorbent material. In other embodiments, the sorbent resin 302 may react to both heat and moisture.

As shown, the sorbent bed 300 is located within one or more ducts 306 that can handle both air flow and liquid flows at different times in the collection process. While in a capture configuration 322 (FIG. 3*a*), air flows through the bed 300 and the resin 302, which captures $CO_2$. Advantageously, when used with a moisture swing sorbent, drawing air through the resin bed 300 quickly dries out recently regenerated sorbent 302, speeding up the process.

According to various embodiments, the sorbent resin 302 within the sorbent bed 300 may take on a number of different forms. In some embodiments, the bed 300 may be packed with a stack of resin beads 318. In other embodiments, the bed may take on other configurations including, but not limited to, Raschig rings, a matrix, a mesh, structured and semi-structured packing, monolithic forms, and the like. In some embodiments, the resin 302 may present different pathways to liquid and gas. For example, in one embodiment, the resin 302 in the sorbent bed 300 may be formed similar to a celldeck, letting fluids flow through passages that cross each other more or less orthogonally. In some embodiments, the pathways may be of different lengths.

According to various embodiments, the resin 302 used in the bed 300 is made thin enough that the front of a hypothetical breakthrough curve is wider than the thickness of the bed 300. In some embodiments, this may be accomplished by designing the resin bed 300 such that liquid flows and air flows are not in the same direction. One flow, such as the air, passes through in a short direction while the other, such as the liquid, goes in a long direction. As a specific example, the resin bed 300 may be monolithic and shaped like a "celldeck" that is able to let fluids flow through passages that cross each other more or less orthogonally.

Beneath the sorbent bed 300 is a collection tray 308. According to various embodiments, the collection tray 308 is responsible for catching the carbon-rich wash water or regeneration fluid 336 as it is leaving the sorbent resin 302. As shown, the collection tray 308 has at least one fluid drain 310. The collection tray 308 directs the liquid towards the drain 310. In some embodiments, the drain 310 may be connected to a system that receives the carbon laden liquid for further processing. In other embodiments, the liquid received through the drain 310 may be sent back to a storage tank, or promoted to a storage tank associated with higher DIC concentrations. Multi-tank upgrade operations will be discussed in greater detail with respect to FIG. 6, below.

It should be noted that while the collection tray 308 appears to be free floating in FIGS. 3*a* and 3*b*, this is simply a consequence of the cross-section being shown. According to various embodiments, the collection tray 308 may be coupled to the device housing or other internal structures, using struts, arms, bridges, and the like.

As shown, in some embodiments, the device 100 moves air through the sorbent bed 300 using a blower 304. While many modern devices for capturing carbon dioxide from the atmosphere are able to operate passively, extracting $CO_2$ from natural air flow, the small-scale $CO_2$ collection devices contemplated herein typically need to take a different path, due to the intended use. In some cases, the device 100 is needed for an indoor application, where wind is not readily available. In other cases, carbon dioxide, though small in amount, may be needed quickly, and waiting for passive collection would not be practical. The use of a blower 304 to drive air through the resin 302 is advantageous in its speed and effectiveness, and does not typically create an energy burden that cannot be easily met in the contexts in which a small-scale $CO_2$ collection device 100 is typically used.

In some embodiments, the blower 304 may push air through the resin 302, while in other embodiments, the blower 304 may be placed upstream, and may pull the air through. It should be noted that while the non-limiting examples shown and discussed herein all make use of a single blower 304 for each device, other embodiments may employ multiple blowers 304 in various configurations. Those skilled in the art will recognize a number of other ways to create an air flow that may be readily adapted for use with the systems and devices contemplated herein.

The blower 304 is in fluid communication with the sorbent bed 300 through one or more ducts 306, according to various embodiments. The air intake 102 and air exhaust 104 of the device 100 are in fluid communication with each other via a path that passes through the sorbent bed 300, through one or more ducts 306, and also through the blower 304, though the order of the blower 304 and the bed 300 may differ from embodiment to embodiment. The at least one duct 306 makes efficient use of the blower 304, forcing all of the air being moved to pass through the sorbent resin 302 of the sorbent bed 300.

According to various embodiments, the air flows through the resin bed 300 in a vertical direction. In some embodiments, including the non-limiting example shown in FIGS. 3*a* and 3*b*, the air flows downward through the resin bed 300, in the same direction as liquid would travel as it drains from the sorbent resin 302 after regeneration is complete. The flow of air in the same direction as the flow of the regenerating liquid may help accelerate drying. The one or more ducts 306 redirect the air outward and around the collection tray 308, allowing the air to move unimpeded, without disrupting the collection of the carbon-laden liquid.

As shown, the overall geometry of the device 100 forces the air below the sorbent bed 300 (i.e. the air that has passed through the sorbent resin 302) to escape sideways, thereafter moving through the series of ducts. Such geometry facilitates the capture of droplets still draining out of the bed, post-regeneration. In some embodiments, there is a single, large duct, while in other embodiments, there may be two, three, four, or more ducts all providing a pathway for fluid movement between the air intake 102 and the air exhaust 104, passing through the sorbent resin 302.

FIG. 3a shows a non-limiting example of a collection device 100 in a capture configuration 322. In the context of the present description and the claims that follow, a capture configuration 322 is an arrangement of the various elements of the collection device 100 that makes it ready for capturing carbon dioxide as it is moved through the device 100 by one or more blowers 304. According to various embodiments, the capture configuration 322 comprises an arrangement that allows an air flow 324, driven by the blower 304 and flowing from the air intake 102 to the air exhaust 104 and passing through the sorbent resin 302 of the sorbent bed 300, the at least one duct 306, and the blower 304. The airflow 324 in the bed 300 should be close to the vertical direction, in some embodiments. In some embodiments the airflow 324 is downward. Forcing air downward through the resin bed 300 will advantageously carry excess water in the same direction as gravity. Other embodiments may drive air in the opposite direction.

FIG. 3b shows the device 100 in a regeneration configuration 334. In the context of the present description and the claims that follow, a regeneration configuration 334 is an arrangement of the elements of the device 100 that make it ready to extract the carbon dioxide captured within the sorbent resin 302. In some embodiments, this extraction may be done in a manner that renders the extracted $CO_2$ useful for other applications including, but not limited to, upgrading, synthesis, and the like.

According to some embodiments, the regeneration configuration 334 comprises an arrangement of the device 100 that allows the sorbent bed 300, or more specifically, the sorbent resin 302, to be submerged in a regeneration fluid 336. In some embodiments, this may be accomplished by flooding a portion of the device 100 with a regeneration fluid 336. In other embodiments, the regeneration configuration 334 comprises an arrangement that allows a regeneration fluid 336 to be sprayed onto the sorbent resin 302. In both cases, the resin 302 transfers captured $CO_2$ into the regeneration fluid 336.

As shown, the device 100 comprises a liquid input 316. The liquid input 316 provides the regeneration fluid 336 needed for a regeneration cycle. In some embodiment, the liquid input 316 may simply be coupled to an external source of regeneration fluid 336. In other embodiments, the liquid input 316 may be coupled to one or more storage tanks 320 that can provide regeneration fluid 336 when needed. Embodiments making use of multiple storage tanks 320 to upgrade $CO_2$ concentrations will be discussed in greater detail with respect to FIG. 6, below.

According to various embodiments, the regeneration fluid 336 may be water when the device 100 is first put into service. However, in some embodiments, the regeneration fluid 336 may be put through the regeneration process multiple times; depending upon the level of DIC loading, the regeneration fluid 336 may be hydroxide, carbonate, and/or bicarbonate brine or solution. Those skilled in the art will recognize that other sorbent materials may be regenerated with other regenerating fluids 336, energy, or materials.

According to various embodiments, the transition from one configuration to the other configuration involves movement of regeneration fluid 336. For example, in some embodiments, moving the device 100 from the capture configuration 322 to the regeneration configuration 334 may comprise flooding at least the sorbent resin 302 of the sorbent bed 300 with the regeneration fluid 336. This fluid will be considered to have a first dissolved inorganic carbon (DIC) concentration 330. It should be noted that the presence of this fluid prevents air flow 324 from passing through the sorbent resin 302, according to various embodiments.

Additionally, moving the device 100 from the regeneration configuration 336 to the capture configuration 322 may comprise removing the regeneration fluid 336 collected in the collection tray 308 as the sorbent bed 300 is leaving the regeneration configuration 336. According to various embodiments, the fluid 336 is removed from the collection tray 308 through the fluid drain 310. The regeneration fluid 336 passing through the fluid drain 310 now has a second DIC concentration 332 that is higher than the first DIC concentration 330. In some embodiments, this fluid 336 having the second DIC concentration 332 may be treated as a liquid product stream 340, and may be removed from the device 100 through a product outlet 338 for further processing or use elsewhere.

As for how these transitions are accomplished, there are a variety of methods. According to various embodiments, the regeneration of a device 100 with a single bed 300 may be accomplished by holding the bed 300 in a container that can be flooded with regenerating liquid 336. Such designs tend to be robust, since they have no moving parts apart from pumps and valves. Other embodiments may be more centered on efficiency, reducing the liquid volume required by sealing the packed bed from the bottom.

See, for example, FIG. 3b. As shown, a small telescoping actuator 326 device pushes a floor plate 328 coupled to the actuator 326 against the bottom 314 of the sorbent bed 300 as part of the regeneration configuration 334. According to various embodiments, the actuator 326 is strong enough, and the seal between the floor plate 328 and the bottom 314 of the bed 300 is tight enough that at least a majority of the regeneration fluid 336 flooding the sorbent resin 302 is prevented from escaping prematurely. In other words, the floor plate 328 and the sorbent bed 300 form a storage/regeneration chamber. In some embodiments, the actuator/floor plate may be central to the air flow, as shown in the non-limiting example of FIG. 3a.

An additional advantage to this configuration is that the air space below the sorbent bed 300 remains accessible for other gas flow, and thereby makes it easy to operate multiple beds 300 on a single return duct, in a continuous fashion. Such a multi-device implementation will be discussed further with respect to FIGS. 7-9, below.

When moving such an embodiment from the regeneration configuration 334 back to the capture configuration 322, the actuator 326 moves the floor plate 328 away from the bottom 314 of the bed 300, the regeneration fluid 336, now loaded with more DIC than it started with, may flow into the collection tray 308 where it can be removed via the fluid drain 310.

In some embodiments, the device may further comprise one or more air filters 106. For example, in the non-limiting example shown in FIGS. 3a and 3b, air filters 106 are located both upstream and downstream of the sorbent bed 300, and are both located between the air intake 102 and the air exhaust 104. The use of filters 106, and the nature of the filters 106 used, may vary depending on the environment in which the device 100 is meant to be used.

Figure 4A:
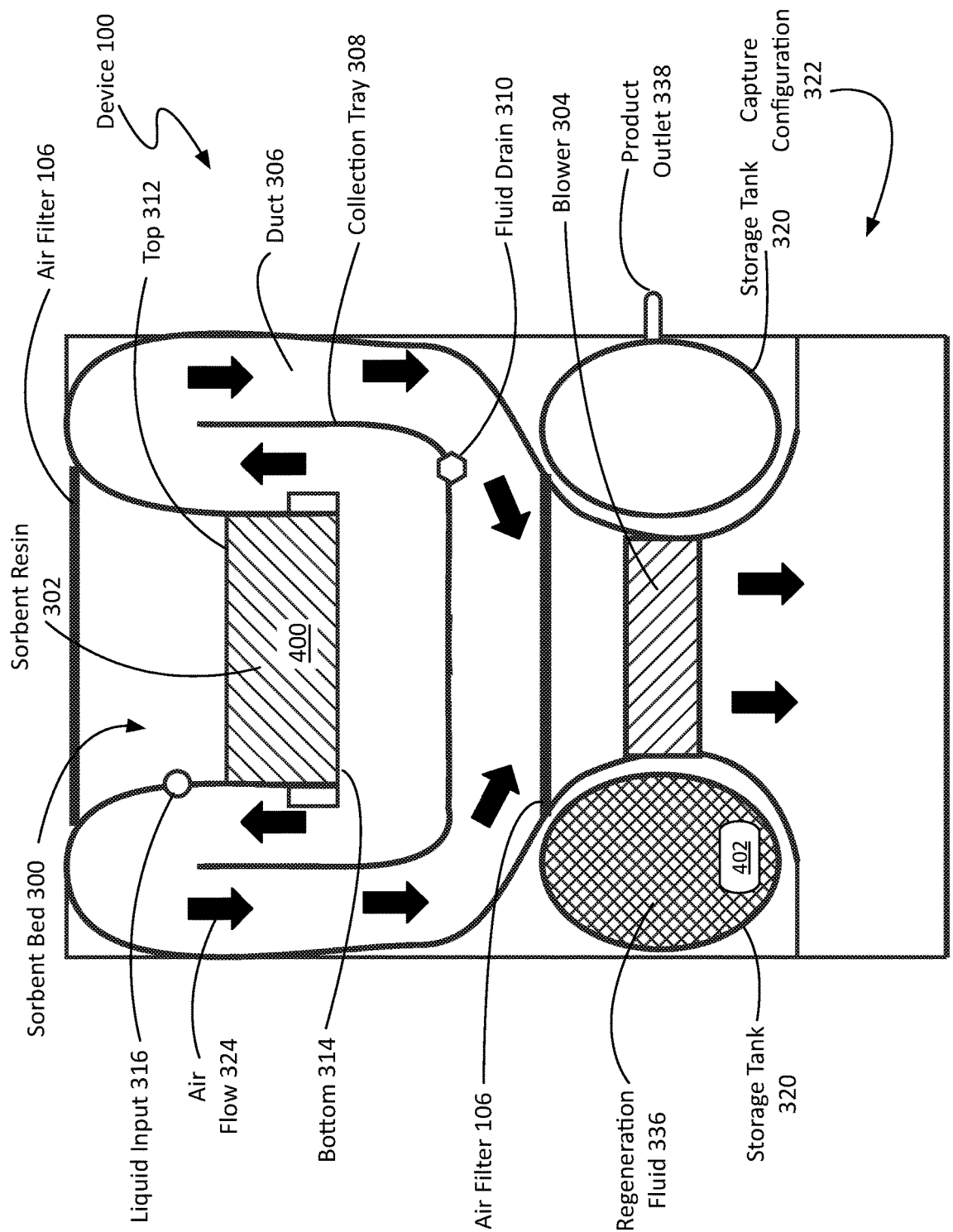
FIGS. 4a and 4b are a cross-sectional view, along line A-A of FIG. 2, of another embodiment of a device for small-scale $CO_2$ collection in capture and regeneration configurations, respectively.

FIG. 4ab is a cross-sectional view, along line A-A of FIG. 2, of another embodiment of a device 100 for small-scale $CO_2$ collection, in capture and regeneration configurations, respectively. Similar to the embodiment shown in FIGS. 3a and 3b, this non-limiting example of a device 100 for small-scale $CO_2$ collection makes use of an actuator 326 to move the device 100 between the capture configuration 322 and the regeneration configuration 334. However, as shown, instead of moving a floor plate 328 up to cover the bottom of the sorbent bed 300, the sorbent bed 300 is lowered until it is resting on the bottom of the collection tray 308.

Similarly, moving the device from the regeneration configuration 334 to the capture configuration 322 involves lifting the bed 300 up with the actuator 326 it is coupled to, allowing the regeneration fluid 336 that had flooded the sorbent resin 302 inside the sorbent bed 300 to flow into the collection tray 308 and out the fluid drain 310.

Figure 4B:
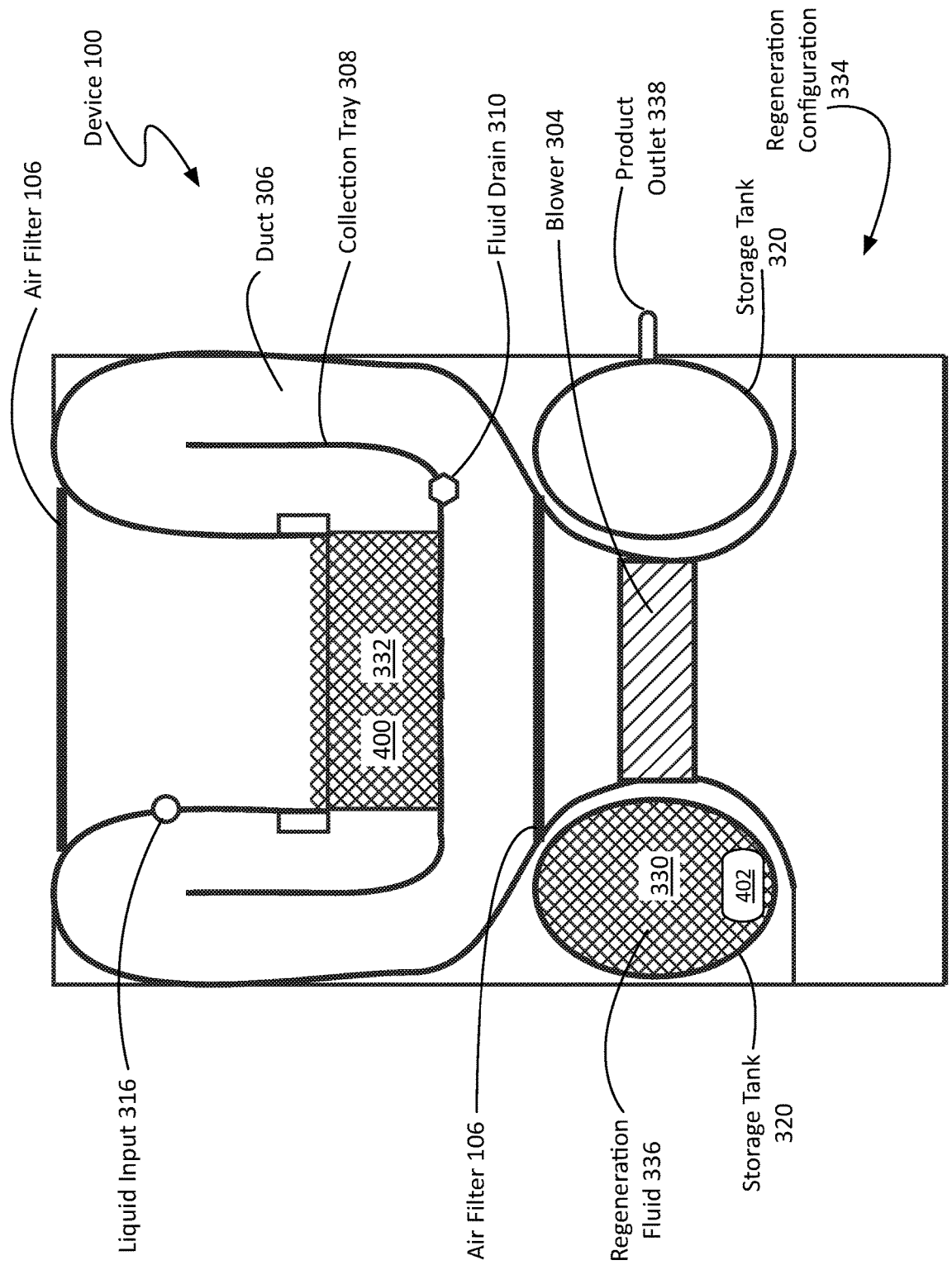

The non-limiting example of a collection device 100 shown in FIGS. 4a and 4b comprises a heater 402. In some embodiments, the resin 302 may release captured $CO_2$ through application of the combination of heat and moisture. In some embodiments, the bed 300 may comprise heaters 402 to heat the regeneration fluid 336 after it has flooded the bed 300, while in other embodiments, the heater(s) 401 may be located elsewhere, such as in thermal contact with a storage tank 320 holding the regeneration fluid 336, heating it before it is applied to the sorbent resin 302.

As mentioned above, some embodiments of the collection device 100 may employ a moisture swing sorbent, while others may make use of other types of $CO_2$ sorbent material or materials. The size of the resin particles largely controls the thickness of the bed 300. The resin particles tend to load faster if they are smaller and have a larger specific surface area. The consequence of this is that the resin 302 will dry, load and unload faster on a thinner bed 300, with less resin 302. On the other hand, at small particle size, surface tension and capillary forces may prevent smooth operation of the resin 302 after wetting and result in channel formation and inefficient drying and loading. Therefore, various embodiments dictate the particle size by balancing these considerations based on the particular properties of a specific resin 302, and the specifics of the regeneration fluid 336. Other embodiments may simply make use of standard size resin beads in which resins 302 are delivered for water preparation, typically having diameters around 0.6 mm.

The height of the bed 300 may be adjusted to provide a compromise between pressure drop, flow speed, and $CO_2$ collection efficiency. The flow speed is modified in some embodiments such that the bed 300 collects a significant fraction of the $CO_2$ in the air passing through. The ideal speed will depend on the equilibrium partial pressure over the partially loaded resin 302 and the cost of pumping air. This equilibrium pressure will increase as loading increases.

In some embodiments, the resin 302 will collect more than 50% of the $CO_2$ in the air that is in excess of the equilibrium concentration, due to the energy invested in the processing of the air. Efficiency may be increased by preventing the equilibrium pressure from getting too high. For example, in one embodiment, the nearly loaded resin 302 may still have an equilibrium partial pressure below 20 Pa in contrast to the 40 Pa of the $CO_2$ partial pressure in ambient air.

Figure 5A:
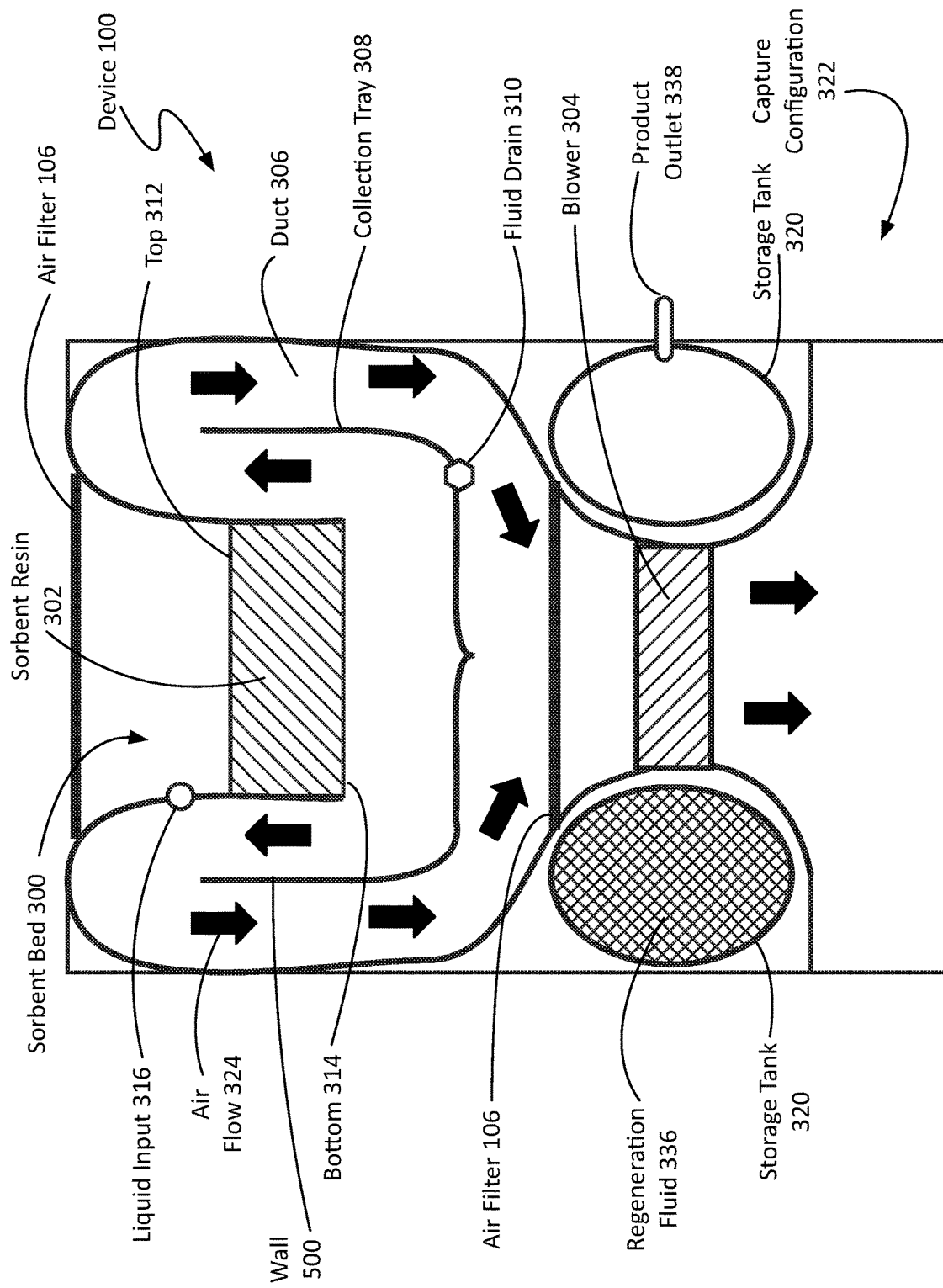
FIGS. 5a and 5b are a cross-sectional view, along line A-A of FIG. 2, of yet another embodiment of a device for small-scale $CO_2$ collection in capture and regeneration configurations, respectively.
Figure 5B:
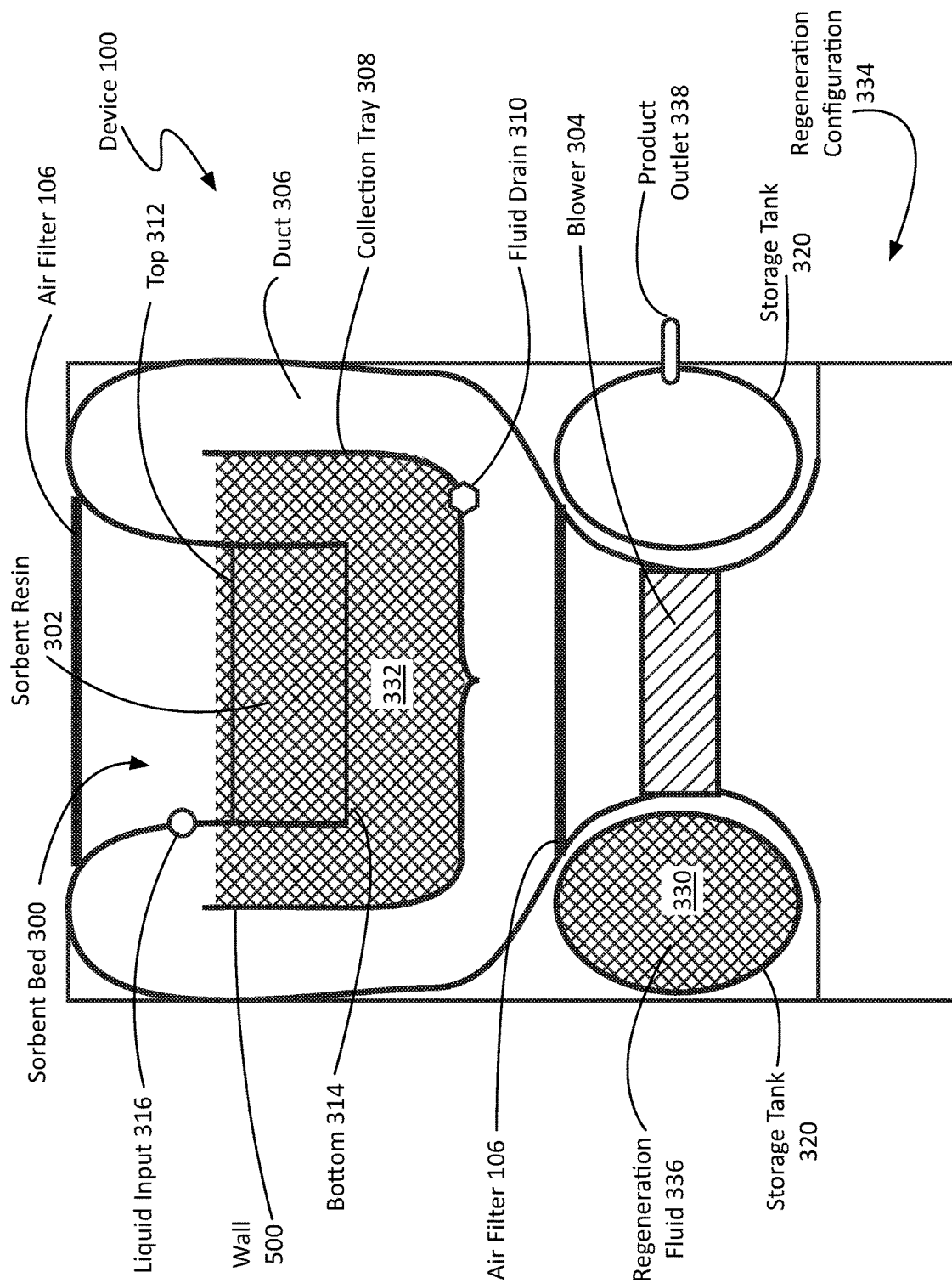

FIGS. 5a and 5b show a cross-sectional view, along line A-A of FIG. 2, of yet another embodiment of a device 100 for small-scale $CO_2$ collection, in capture and regeneration configurations, respectively. The previous two non-limiting examples of flooding the sorbent bed 300 by closing off the bottom 314 of the bed 300 were advantageous in that they minimized the amount of regeneration fluid 336 being used. The embodiment of the device 100 shown in FIGS. 5a and 5b takes a different approach. Rather than filling the sorbent bed 300 with the regeneration fluid 336, a portion of the collection tray 308 itself fills, with the fluid level (as well as the side walls 500 of the tray 308) rising high enough that the sorbent bed 300 is submerged. As previously stated, while this approach uses more fluid 336, it has the advantage of not requiring an actuator 326 or any other moving of parts, other than the operation of pumps and valves necessary to provide the regeneration fluid 336 through the liquid input 316. When regeneration is complete, the tray 308 is emptied through the drain 310.

In general, when the resin 302 has been loaded with $CO_2$, it becomes necessary to harvest the captured $CO_2$ and regenerate the resin 302. According to various embodiments, it is possible to flood the "resin chamber" with a hydroxide, carbonate, or bicarbonate brine. The dissolved inorganic carbon (DIC) concentration in the brine may be modified to be sufficiently low that the equilibrium partial pressure over it is less than that of the wet resin. It may be expected that the equilibrium partial pressure over the wet resin is significantly higher than over the dry resin that has been loaded by the ambient air. Typical values for the partial pressure of $CO_2$ over the discharge stream range from 10 to 20 kPa down to levels as low as 100 Pa.

Embodiments may vary in how far down the resin 302 is to be discharged. For example, in one embodiment, the resin 302 may be exposed to ever lower $CO_2$ loading in the regeneration fluid 336, so that the regeneration fluid 336 can initially be loaded to high levels of DIC, and then proceed to progressively lower levels. In other embodiments, it is possible to lower the salinity of the regeneration fluid 336 at the end of the cycle, in order to avoid the caking of the resin 302 with dry carbonate or bicarbonate residual. This last rinse can be integrated with the delivery of makeup water 610 (i.e. water introduced to the device to replace water vapor gradually lost to the environment during operation) from a makeup water source 612.

The device 100 may introduce one or more regeneration fluids 336 that are designed to rinse the resin 302 in sequence. In some embodiments, the spent regeneration fluid 336 may be returned to a storage tank 320. In embodiments having multiple regeneration fluid 336, the spent fluid may not be returned to the storage tank 320 it came from but instead sent to a tank 320 that contains a higher level of DIC or, a higher level of salinity. Some embodiments may make use of 1 to 10 storage tanks 320, while others may employ even more.

In some embodiments, the regeneration fluid 336 also acts as a $CO_2$ storage system, and may be stored in a number of intermediate storage tanks 320. As a specific example, water would be introduced to the device 100 in the form of makeup water 610 and get added to the last wash where it is gradually transferred to ever-higher DIC loadings. The most highly loaded fluid 336 represents the liquid product stream 340 from which $CO_2$ is removed. The $CO_2$ may be removed from the fluid 336 by any of several means known in the art. The resulting lean fluid 604 is then returned to an early stage of the device 100, right after the makeup water 610 entry. Once the resin 302 has been drained of its DIC, it is allowed to drain out the residual fluid, and then will be once again exposed to dry air flowing through the device 100.

Figure 6:
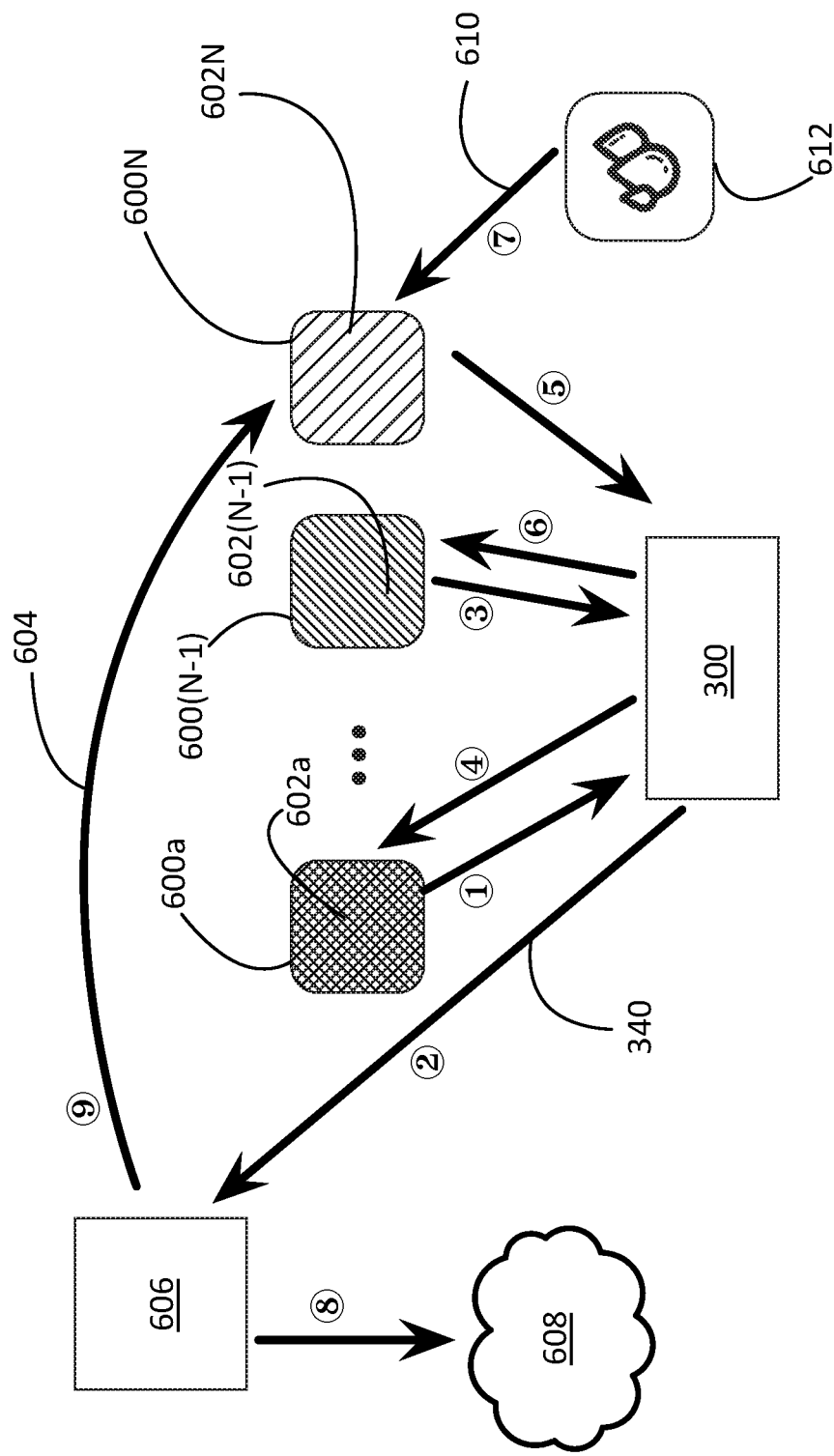
FIG. 6 is a schematic view of a device for small-scale $CO_2$ collection and upgrading.

FIG. 6 is a schematic view of a non-limiting example of a device 100 for small-scale $CO_2$ collection that implements the upgrade procedure discussed above. As shown, this particular device 100 is coupled to a plurality of storage tanks 320 made up of N storage tanks 320, including a first storage tank 600a, a last storage tank 600N, and a second-to-last storage tank 600(N−1). Each of these tanks holds regeneration fluid 336, and the fluid 336 held in each tank 320 has a different DIC concentration 602. Specifically, the first storage tank 600a has the highest DIC concentration 602a, the second-to-last storage tank 600(N−1) has the second-to-lowest DIC concentration 602(N−1), and the last storage tank 600N has the lowest DIC concentration 602N.

It should be noted that, although only three tanks 320 are depicted in FIG. 6, they represent N discrete storage tanks 320. According to various embodiments, all N of these storage tanks 320 are in fluid communication with both the liquid input 316 and the fluid drain 310; a plurality of valves (not shown) controls which tank is sending fluid 336 and which tank is receiving fluid 336. Furthermore, it should be noted that FIG. 6 shows these tanks 320 interacting with a sorbent bed 300. This simplistic view of the device 100 is for clarity purposes only; the lack of depiction of the various elements of different embodiments of the collection device 100 discussed at length above should in no way be interpreted as a limitation, or an indication that they are not needed. Rather, FIG. 6 is a schematic view of the process of upgrading DIC concentration using multiple storage tanks 320.

According to various embodiments, the regeneration process will comprise flooding the sorbent resin 302 with each of the regeneration fluids 336 contained in the N storage tanks, in turn. The process begins with the first storage tank 600a, which holds the regeneration fluid 336 having the highest DIC concentration 602a. See circle '1'. Washing the $CO_2$-laden sorbent resin 302 with the fluid 336 from the first storage tank 600a increases the DIC concentration 602a of the fluid by a small amount, reaching a saturation point that has been deemed to be sufficient for harvest. After washing the resin 302 with this fluid 336, the drain 310 sends it elsewhere. See circle '2'. In some embodiments, this highly concentrated DIC-rich fluid may be stored for later processing. In other embodiments, the device may comprise, or may be coupled to, a carbon dioxide extractor 606, which is configured to extract gaseous carbon dioxide 608 from carbon-rich regeneration fluid 336, using any of the processed known in the art including, but not limited to, electrolysis.

Next, the resin 302 is washed with the fluid 336 from the next storage tank. The resulting fluid 336 is sent to the next highest storage tank (in terms of DIC concentration). For example, if the device 100 depicted in FIG. 6 only actually had three storage tanks, then after receiving the fluid 336 from the second-to-last tank 600(N−1) (see circle '3'), the resulting brine is sent to the next higher concentrated tank, in this case the first tank 600a. See circle '4'.

Finally, fluid 336 is taken from the last storage tank 600N. See circle '5'. The resulting fluid 336 is passed to the second-to-last tank 600(N−1). See circle '6'. Over time, the regeneration fluid 336 will lose water content to evaporation. It will need to be replaced to maintain desired concentrations and keep salinity at bay. According to various embodiments, this makeup water 610, taken from a makeup water source 612, is sent to the last storage tank 600N. See circle '7'. As the process continues, this additional water will make its way up the chain.

Turning back to the carbon dioxide extractor 606, according to various embodiments, the carbon dioxide extractor 606 receives a regeneration fluid 336 high in carbon content, and processes it, yielding gaseous carbon dioxide 608 (see circle '8') and a lean regeneration fluid 604, meaning regeneration fluid 604 that has very low DIC concentration. According to various embodiments, this lean regeneration fluid 604 is placed in the second-to-last storage tank 600 (N−1). See circle '9'. The gaseous carbon dioxide 608 may be used immediately, and/or may be saved for direct use or for further processing to increase concentration, purity or pressure.

In some embodiments, a carbon dioxide extractor 606 may be employed. In other embodiments, gaseous carbon dioxide 608 may be released inside the device 100. Gas released inside the device 100 may be harvested using a sweep gas having a lower $CO_2$ concentration than the target $CO_2$ gas, according to various embodiments. In some bases, the gaseous carbon dioxide 608 may be evolved from the regeneration fluid 336 through the lowering of the total pressure within the device 100. As an option, in some embodiments one or more vacuum pumps may be used to remove gas from the device and/or evolve gaseous carbon dioxide 608 from laden regeneration fluid 336.

According to various embodiments, multiple $CO_2$ collection devices may be employed together as a system 700 capable of providing a continuous product stream having upgraded concentration of $CO_2$. In some embodiments, a system 700 may comprise a plurality of individual devices 100 whose only cooperation is that they feed the same set of storage tanks 320.

In other embodiments, the system 700 may have a long straight duct, or a large horizontal chamber or manifold, with openings in a flat roof, each containing a sorbent bed 300. The regeneration occurs separately for each unit, with a bottom lid or baffle rising from the floor of the chamber to substantially seal the sorbent bed 300 and hold the regeneration fluid 336 in place. In some embodiments, small leakage is acceptable, as there is likely some residual liquid flow after the regeneration cycles have been completed. In one embodiment, the baffle may be hinged to the bottom of the sorbent bed 300. In another embodiment, the baffle or lid could rise from the bottom of the manifold like a piston. In yet another embodiment, the packed resin bed 300 drops to the bottom of the manifold, thereby closing off pathways for fluids to flow through the bed 300 and into the manifolds.

In some embodiments, a system 700 may be composed of multiple collection devices 100, each operating independently. In other embodiments, a system 700 may comprise a plurality of collection devices 100 operating in concert. See, for example, the non-limiting examples shown in FIGS. 7-12.

Figure 7:
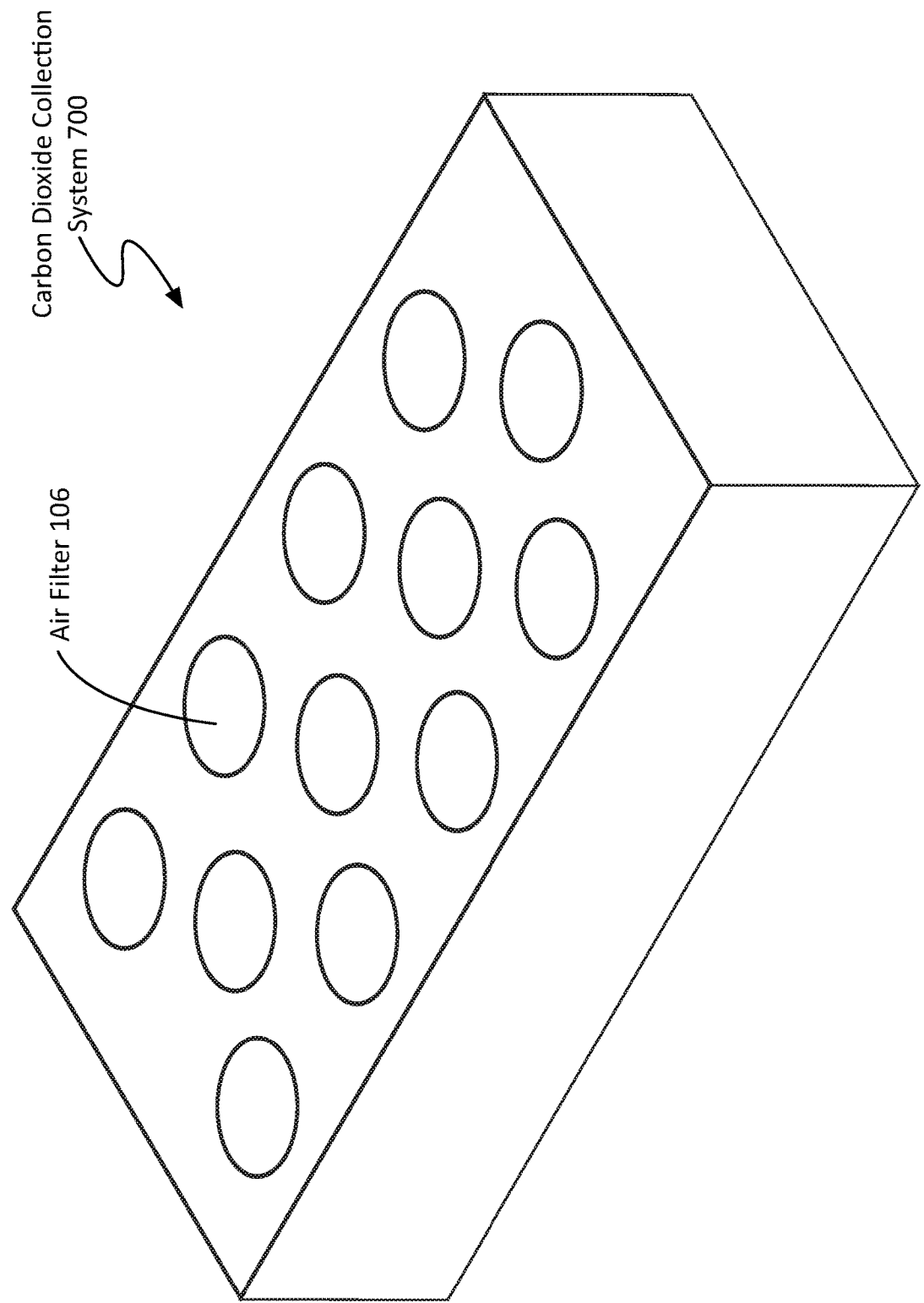
FIG. 7 is a perspective view of a system for small-scale $CO_2$ collection.
Figure 8:
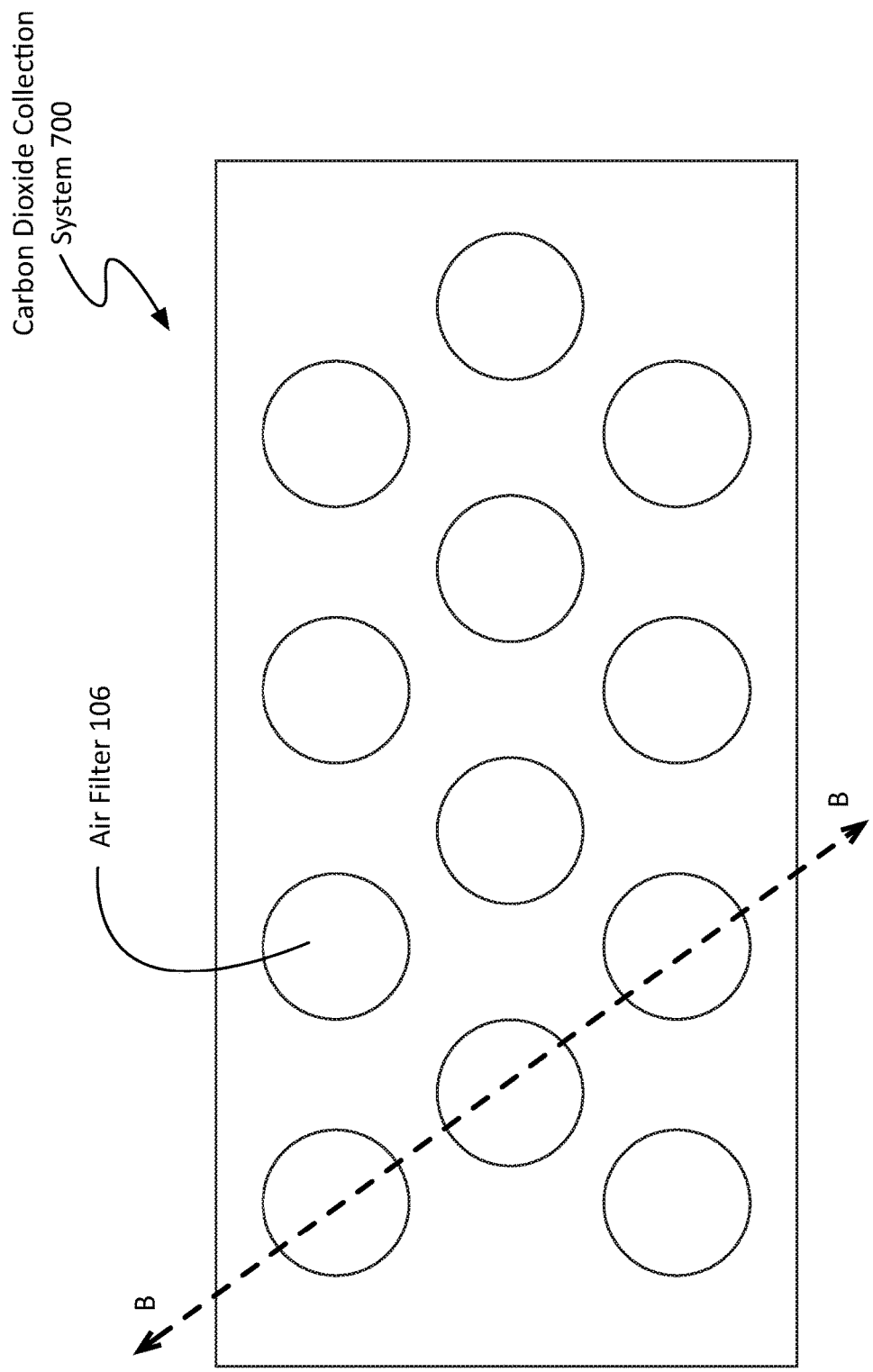
FIG. 8 is a top view of the system of FIG. 7.
Figure 9:
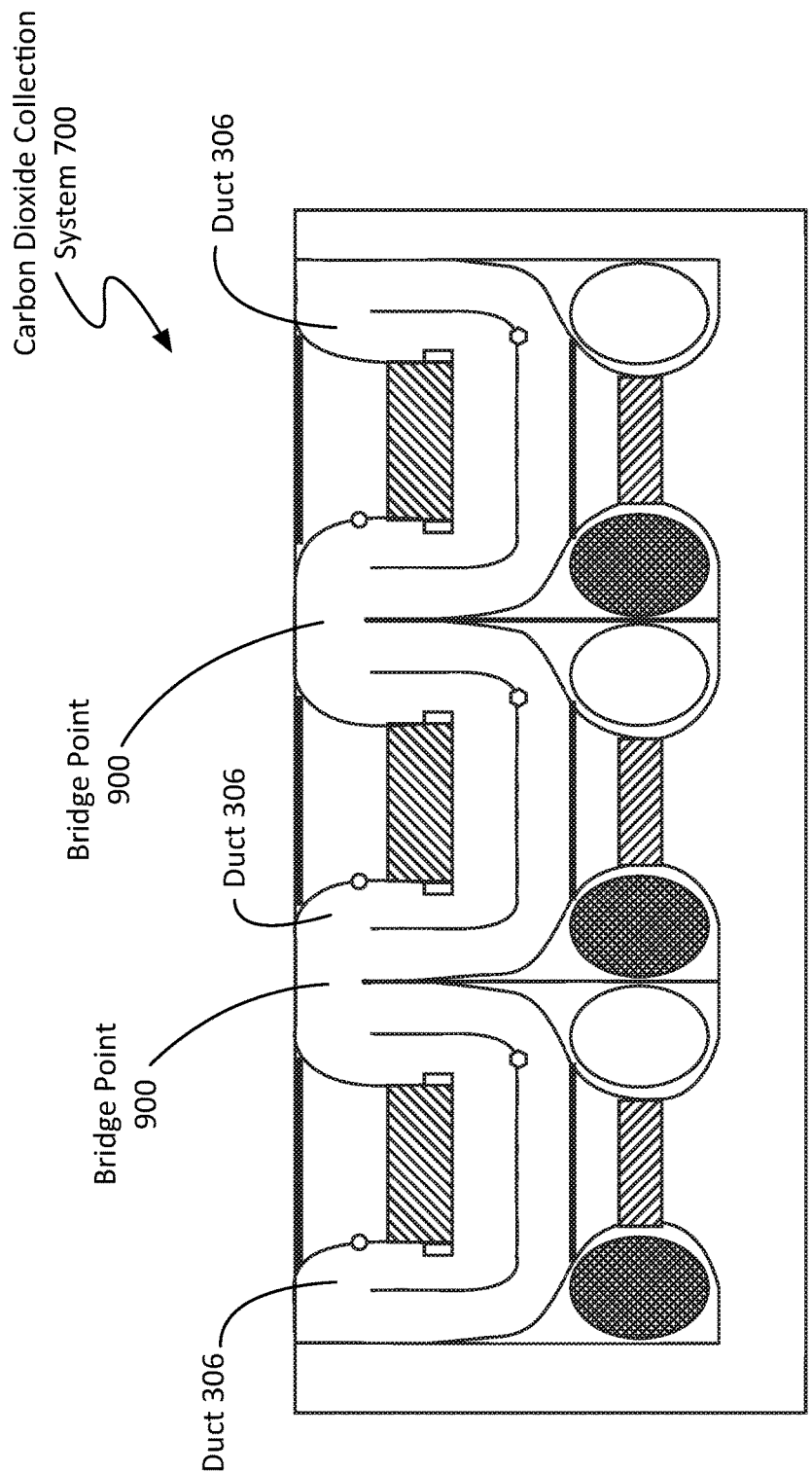
FIG. 9 is a cross-sectional view, along line B-B of FIG. 8, of a parallel system for small-scale $CO_2$ collection.

FIG. 7 is a perspective view of a non-limiting example of a system comprising multiple devices 100 for small-scale $CO_2$ collection. FIG. 8 is a top view of the system 700 of FIG. 7. FIG. 9 is a cross-sectional view, along line B-B of FIG. 8, of a non-limiting example of a system 700 for small-scale $CO_2$ collection having a parallel architecture.

As shown, the various devices 100 with the system 700 are not entirely isolated from each other. Each carbon dioxide collection device 100 in the system 700 has at least one duct 306 joined and in fluid communication with at least one duct 306 belonging to another device 100. According to various embodiments, these points where two ducts 306 are called bridge points 900. These bridge points 900 are located along the duct somewhere between the blower and the sorbent bed.

The joining of ducts 306 in this way is advantageous in a system 700. By joining the ducts 306, when one device has transitioned into the regeneration configuration, rather than halting all air flow as happens in stand-alone devices (according to some embodiments), the air flow driven by the blower of the unit being regenerated is now shared with the other devices. Another advantage may be found in systems where the devices 100 are releasing gaseous carbon dioxide within their ducts, where it is removed using a sweep gas. By joining the ducts of multiple devices, one gust of sweep gas may be used to collect carbon dioxide from multiple units, increasing energy efficiency.

Another advantage of a system 700 over individual devices 100 can be seen when the various devices 100 are staggered in operation. According to various embodiments, a system 700 with multiple devices 100 may be timed such that, at any given time, at least one device is being regenerated using regeneration fluid 336 having a high DIC concentration (e.g. regeneration fluid 336 from the first storage tank 600a in the device of FIG. 6, etc.), with the resulting fluid being used to generate a product stream. By timing the devices in this way, a continuous product stream (e.g. liquid product stream for storage or further processing, gaseous product stream generated by a carbon dioxide extractor, etc.) can be produced.

Figure 10:
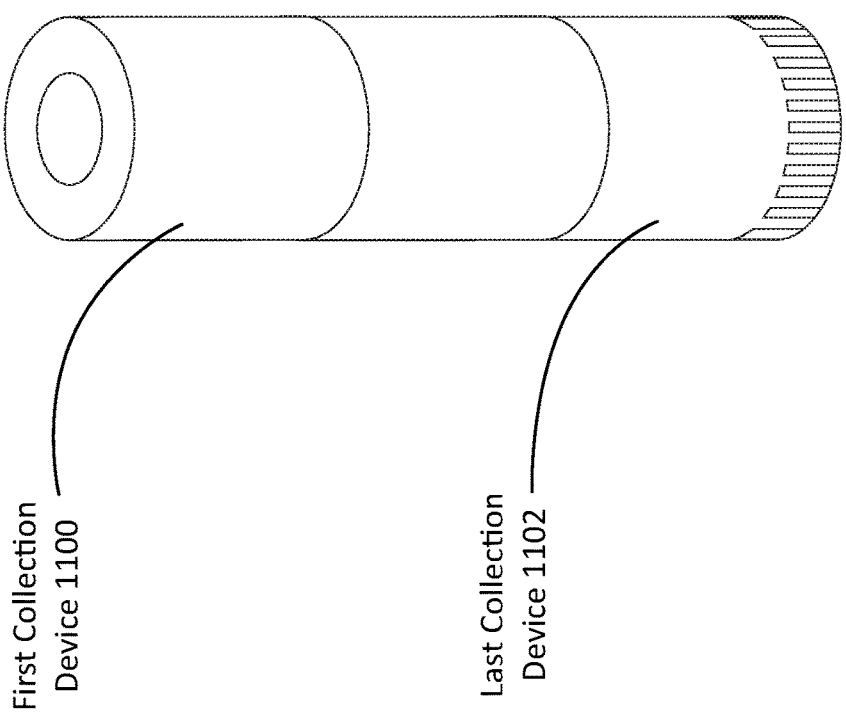
FIG. 10 is a perspective view of a system for small-scale $CO_2$ collection.
Figure 11:
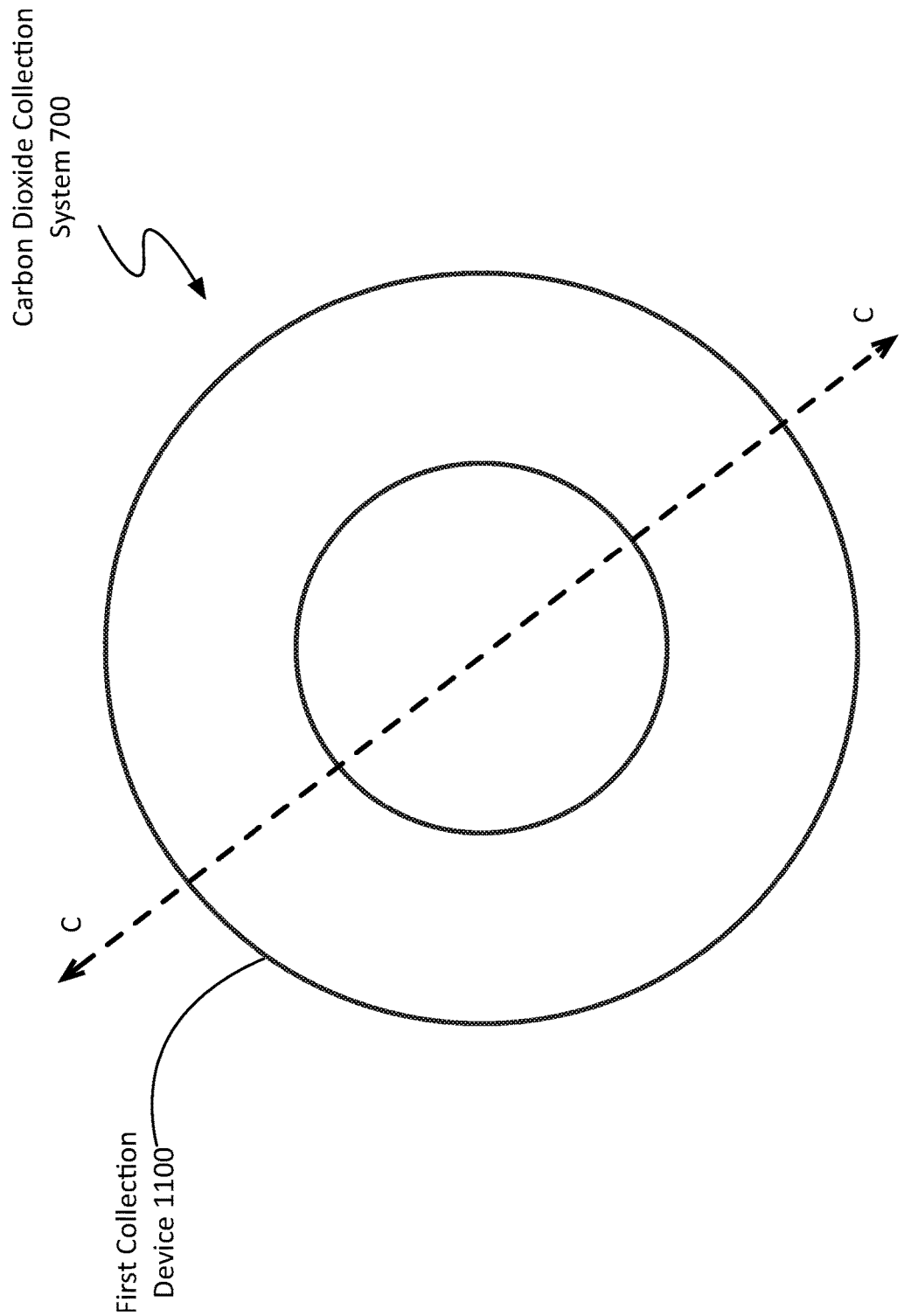
FIG. 11 is a top view of the system of FIG. 7.
Figure 12:
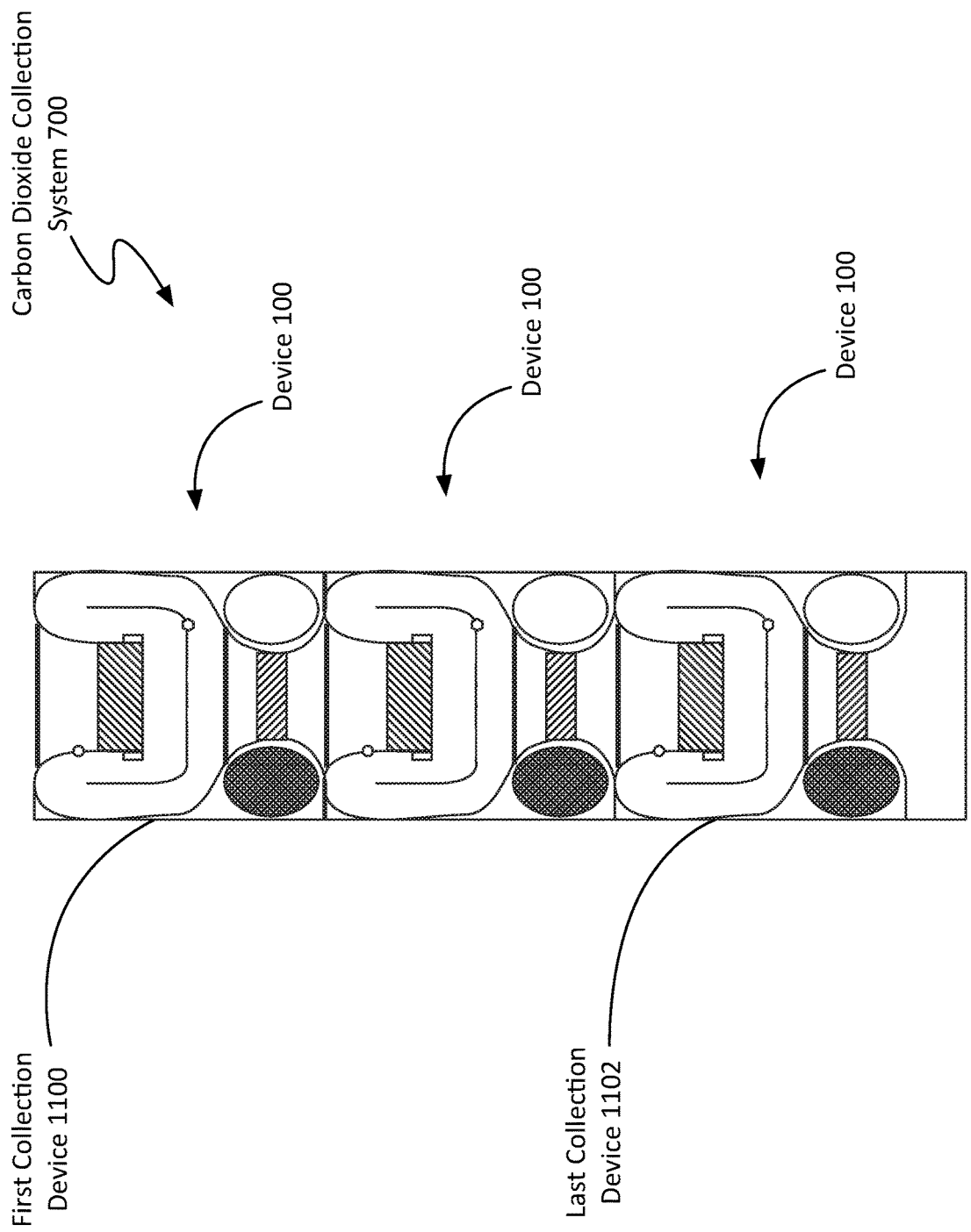
FIG. 12 is a cross-sectional view, along line C-C of FIG. 11, of a series system for small-scale $CO_2$ collection.

FIGS. 10-12 show various views of a non-limiting example of a system 700 for small-scale $CO_2$ collection that is arranged in series. Specifically, FIG. 10 is a perspective view of the non-limiting example of a system 700, FIG. 11 is a top view of the system 700 of FIG. 10, and FIG. 12 is a cross-sectional view, along line C-C of FIG. 11, of a system 700 with small-scale $CO_2$ collection devices arranged in series.

As shown, a plurality of carbon dioxide collection devices 100 are connected in series, meaning that for all carbon dioxide collection devices 100 in the system 700 (except for a first collection device 1100 and a last collection device 1102), the air intake 102 of each device 100 is in fluid communication with the air exhaust 104 of another device 100 and each device 100 is coupled to two other devices 100. As for the first and last collection devices, they serve as endpoints. The first collection device 1100 brings in the air, and the last collection device 1102 blows it out, according to various embodiments. A series arrangement may be advantageous in situations where it is more important to remove as much $CO_2$ as possible from the input gas, even if it has to be done in a batched fashion.

According to various embodiments, the operation of the $CO_2$ collection systems and devices contemplated herein, either individually or in groups, may be automated and configured to adapt the capture and regeneration phases in response to changes in ambient conditions, resulting in efficient and effective performance. Some embodiments of the device may further comprise one or more sensors to monitor ambient conditions such as air flow speed, humidity, temperature, and the various properties of the regeneration fluids 336, such as salinity and the like. Other sensors may examine other properties including, but not limited to, pressure, gas composition and other relevant parameters.

It will be understood that embodiments are not limited to the specific components disclosed herein, as virtually any components consistent with the intended operation of a system, device and/or method implementation for small scale $CO_2$ collection may be utilized. Accordingly, for example, although particular devices, systems, and sorbents may be disclosed, such components may comprise any shape, size, style, type, model, version, class, grade, measurement, concentration, material, weight, quantity, and/or the like consistent with the intended operation of a system, device and/or method implementation for small scale $CO_2$ collection may be used. In places where the description above refers to particular embodiments of $CO_2$ extraction systems, devices and materials, it should be readily apparent that a number of modifications may be made without departing from the spirit thereof and that these implementations may be applied to other $CO_2$ capture systems, devices, and methods.

What is claimed is:

1. A carbon dioxide collection system, comprising:
a plurality of carbon dioxide collection devices, each device comprising:
a sorbent bed comprising a sorbent resin;
a blower in fluid communication with the sorbent bed through at least one duct;
a collection tray beneath the sorbent bed, the collection tray comprising a fluid drain;
an air intake and an air exhaust in fluid communication with the air intake through the sorbent bed, the at least one duct, and the blower;
a capture configuration comprising an air flow driven by the blower and flowing from the air intake to the air exhaust and passing through the sorbent resin of the sorbent bed, the at least one duct, and the blower; and
a regeneration configuration comprising the sorbent bed submerged in a regeneration fluid;
wherein moving the device from the capture configuration to the regeneration configuration comprises flooding at least the sorbent resin of the sorbent bed with the regeneration fluid having a first dissolved inorganic carbon (DIC) concentration, the regeneration fluid introduced to the sorbent resin via a liquid input and preventing the air flow from passing through the sorbent resin; and
wherein moving the device from the regeneration configuration to the capture configuration comprises removing the regeneration fluid collected in the collection tray through the fluid drain in the collection tray, the regeneration fluid passing through the fluid drain having a second DIC concentration higher than the first DIC concentration.

2. The system of claim 1:
wherein, for each carbon dioxide collection device of the plurality of carbon dioxide collection devices, one of the at least one ducts is coupled to and in fluid communication with one of the at least one ducts of a different carbon dioxide collection device at a bridge point on each of the two ducts; and
wherein, for each carbon dioxide collection device of the plurality of carbon dioxide collection devices, all bridge points are located between the blower and the sorbent bed.

3. The system of claim 1:
wherein the plurality of carbon dioxide collection devices are connected in series, such that for all carbon dioxide collection devices except a first collection device and a last collection device, the air intake of each device is in fluid communication with the air exhaust of another device and each device is coupled to two other devices; and
wherein the first collection device and the last collection device are each only coupled to a single collection device.

4. The system of claim 1, further comprising:
at least two storage tanks, comprising at least a first storage tank containing regeneration fluid having the highest DIC concentration of the system and a last storage tank containing regeneration fluid having the lowest DIC concentration of the system;
wherein each storage tank of the at least two storage tanks is in fluid communication with both the liquid input and the fluid drain of each carbon dioxide collection device of the plurality of carbon dioxide collection devices;
wherein, for each carbon dioxide collection device of the plurality of carbon dioxide collection devices, while in the regeneration configuration, the regeneration fluid of each of the at least two storage tanks is used in turn to flood the sorbent resin as the regeneration fluid having the first DIC concentration;

wherein, for each carbon dioxide collection device of the plurality of carbon dioxide collection devices, while in the regeneration configuration, the regeneration fluid having the second DIC concentration is passed through the fluid drain to the storage tank having the next higher DIC concentration as the storage tank that provided the regeneration fluid having the first DIC concentration;

wherein, for each carbon dioxide collection device of the plurality of carbon dioxide collection devices, the regeneration fluid taken from the first storage tank, having the highest DIC concentration, is used to flood the sorbent resin and then sent down the fluid drain, all fluid drains coupled to a product outlet emitting a liquid product stream; and wherein makeup water is added to the last storage tank of the at least two storage tanks.

5. The system of claim 4, further comprising a carbon dioxide extractor in fluid communication with the product outlet, the carbon dioxide extractor receiving the liquid product stream, extracting gaseous carbon dioxide from the liquid product stream.

6. The system of claim 5, further comprising at least three storage tanks comprising a first storage tank containing regeneration fluid with the highest DIC concentration, a last storage tank containing regeneration fluid with the lowest DIC concentration, and a second-to-last storage tank containing regeneration fluid with the second-to-lowest DIC concentration, wherein the carbon dioxide extractor produces a lean regeneration fluid by extracting gaseous carbon dioxide from the liquid product stream, and wherein the lean regeneration fluid is stored in the second-to-last storage tank.

7. The system of claim 4, wherein the transition between the capture configuration and the regeneration configuration is staggered for each carbon dioxide collection device of the plurality of carbon dioxide collection devices, such that the liquid product stream is continuous.

8. A carbon dioxide collection device, comprising:
a sorbent bed comprising a sorbent resin;
a blower in fluid communication with the sorbent bed through at least one duct;
a collection tray beneath the sorbent bed, the collection tray comprising a fluid drain;
an air intake and an air exhaust in fluid communication with the air intake through the sorbent bed, the at least one duct, and the blower;
a capture configuration comprising an air flow driven by the blower and flowing from the air intake to the air exhaust and passing through the sorbent resin of the sorbent bed, the at least one duct, and the blower; and
a regeneration configuration comprising the sorbent bed submerged in a regeneration fluid;
wherein moving the device from the capture configuration to the regeneration configuration comprises flooding at least the sorbent resin of the sorbent bed with the regeneration fluid having a first dissolved inorganic carbon (DIC) concentration, the regeneration fluid introduced to the sorbent resin via a liquid input and preventing the air flow from passing through the sorbent resin; and
wherein moving the device from the regeneration configuration to the capture configuration comprises removing the regeneration fluid collected in the collection tray through the fluid drain in the collection tray, the regeneration fluid passing through the fluid drain having a second DIC concentration higher than the first DIC concentration.

9. The device of claim 8, wherein the sorbent resin is a moisture swing carbon dioxide sorbent.

10. The device of claim 8, further comprising:
an actuator coupled to a floor plate;
wherein the sorbent bed has a top and a bottom opposite the top;
wherein moving the device from the capture configuration to the regeneration configuration further comprises pressing the floor plate against the bottom of the sorbent bed with the actuator, preventing a majority of the regeneration fluid flooding the sorbent resin from escaping the sorbent bed; and
wherein moving the device from the regeneration configuration to the capture configuration further comprises moving the floor plate away from the bottom of the sorbent bed using the actuator, allowing the regeneration fluid to flow into the collection tray and out the fluid drain.

11. The device of claim 8, further comprising:
an actuator coupled to the sorbent bed;
wherein the sorbent bed has a top and a bottom opposite the top;
wherein moving the device from the capture configuration to the regeneration configuration comprises moving the sorbent bed downward with the actuator, pressing the bottom of the sorbent bed against the collection tray, preventing a majority of the regeneration fluid flooding the sorbent resin from escaping the sorbent bed; and
wherein moving the device from the regeneration configuration to the capture configuration further comprises moving the sorbent bed away from the collection tray using the actuator, allowing the regeneration fluid to flow into the collection tray and out the fluid drain.

12. The device of claim 8:
wherein the collection tray comprises at least one wall encircling the collection tray, the at least one wall extending upward higher than the sorbent bed;
wherein moving the device from the capture configuration to the regeneration configuration comprises flooding the collection tray with regeneration fluid until the sorbent resin is submerged in the regeneration fluid; and
wherein moving the device from the regeneration configuration to the capture configuration comprises draining the regeneration fluid from the collection tray through the fluid drain.

13. The device of claim 8, wherein the air flow passes downward through the sorbent resin.

14. The device of claim 8, further comprising at least one air filter, wherein the at least one air filter is located between the air intake and the air exhaust.

15. The device of claim 8, wherein the regeneration fluid is one of a hydroxide solution, a carbonate solution, and a bicarbonate solution.

16. The device of claim 8, wherein the sorbent resin comprises a plurality of packed sorbent beads.

17. The device of claim 8, further comprising at least one storage tank of regeneration fluid in fluid communication with the liquid input.

18. The device of claim 17, wherein makeup water is added to a last storage tank of the at least one storage tank from a makeup water source coupled to the last storage tank, the last storage tank being the storage tank holding the regeneration fluid having the lowest DIC concentration.

19. The device of claim 8, further comprising:
- at least two storage tanks, comprising at least a first storage tank containing regeneration fluid having the highest DIC concentration and a last storage tank containing regeneration fluid having the lowest DIC concentration;
- wherein each storage tank of the at least two storage tanks is in fluid communication with both the liquid input and the fluid drain;
- wherein, while in the regeneration configuration, the regeneration fluid of each of the at least two storage tanks is used in turn to flood the sorbent resin as the regeneration fluid having the first DIC concentration;
- wherein, while in the regeneration configuration, the regeneration fluid having the second DIC concentration is passed through the fluid drain to the storage tank having the next higher DIC concentration as the storage tank that provided the regeneration fluid having the first DIC concentration;
- wherein the regeneration fluid taken from the first storage tank, having the highest DIC concentration, is used to flood the sorbent resin and then sent down the fluid drain and through a product outlet as a liquid product stream; and
- wherein makeup water is added to the last storage tank of the at least two storage tanks.

20. The device of claim 19, further comprising a carbon dioxide extractor in fluid communication with the product outlet, the carbon dioxide extractor receiving the liquid product stream, extracting gaseous carbon dioxide from the liquid product stream.

* * * * *